(12) United States Patent
Weaver et al.

(10) Patent No.: US 8,104,054 B2
(45) Date of Patent: Jan. 24, 2012

(54) METHODS, SYSTEMS, AND DEVICES FOR BANDWIDTH CONSERVATION

(75) Inventors: Timothy H. Weaver, Alpharetta, GA (US); Albert Whited, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 840 days.

(21) Appl. No.: 11/298,397

(22) Filed: Dec. 9, 2005

(65) Prior Publication Data
US 2007/0133603 A1   Jun. 14, 2007

Related U.S. Application Data

(60) Provisional application No. 60/713,487, filed on Sep. 1, 2005.

(51) Int. Cl.
*H04H 60/32* (2008.01)
*H04H 60/33* (2008.01)
(52) U.S. Cl. .......................................... 725/14; 725/10
(58) Field of Classification Search ............... 725/1–153; 463/40
See application file for complete search history.

(56) References Cited

U.S. PATENT DOCUMENTS

| | | | |
|---|---|---|---|
| 4,017,676 A | 4/1977 | Rabeler et al. | |
| 4,380,687 A | 4/1983 | Stewart | |
| 4,439,784 A | 3/1984 | Furukawa et al. | |
| 4,769,697 A | 9/1988 | Gilley et al. | |
| 4,802,022 A | 1/1989 | Harada | |
| 4,903,130 A | 2/1990 | Kitagawa et al. | |
| 4,907,079 A | 3/1990 | Turner et al. | |
| 5,255,180 A | 10/1993 | Shinoda et al. | |
| 5,278,654 A | 1/1994 | Yang | |
| 5,313,282 A | 5/1994 | Hayashi | |
| 5,331,354 A | 7/1994 | Koyama et al. | |
| 5,731,764 A | 3/1998 | Tanaka | |
| 5,793,409 A | 8/1998 | Tetsumura | |
| 5,844,600 A | 12/1998 | Kerr | |
| 5,874,986 A | 2/1999 | Gibbon et al. | |
| 5,892,856 A | 4/1999 | Cooper et al. | |
| 5,892,859 A | 4/1999 | Grote | |
| 5,995,153 A | 11/1999 | Moeller et al. | |
| 6,014,694 A | 1/2000 | Aharoni et al. | |
| 6,025,869 A | 2/2000 | Stas et al. | |
| 6,052,734 A | 4/2000 | Ito et al. | |
| 6,057,872 A * | 5/2000 | Candelore | 725/23 |

(Continued)

FOREIGN PATENT DOCUMENTS
WO   WO03/058478 A1   7/2003

OTHER PUBLICATIONS d'Hunt, Susy, "The Cutting Edge of RFID Technology and Application for Manufacturing and Distribution", TEXAS Instrument TIRIS, Apr. 16, 2004, retrieved from http://www.ti.com/rfid/docs/manuals/whrPapers/manuf_dist.pdf, pp. 1-13.

(Continued)

*Primary Examiner* — Brian Pendleton
*Assistant Examiner* — Jason Lin
(74) *Attorney, Agent, or Firm* — Cantor Colburn LLP

(57) ABSTRACT

Methods, systems, and devices are disclosed for conserving bandwidth. A user's bandwidth consumption is monitored and compared to a threshold value. When the user's bandwidth consumption equals or exceeds the threshold value, then behavior is incentivized that reduces the user's bandwidth consumption.

19 Claims, 21 Drawing Sheets

U.S. PATENT DOCUMENTS

| | | | |
|---|---|---|---|
| 6,078,589 A | 6/2000 | Kuechler | |
| 6,147,992 A | 11/2000 | Giroir et al. | |
| 6,177,931 B1 * | 1/2001 | Alexander et al. | 725/52 |
| 6,216,956 B1 | 4/2001 | Ehlers et al. | |
| 6,237,022 B1 | 5/2001 | Bruck | |
| 6,240,460 B1 | 5/2001 | Mitsutake et al. | |
| 6,260,111 B1 | 7/2001 | Craig et al. | |
| 6,315,668 B1 | 11/2001 | Metke et al. | |
| 6,324,182 B1 | 11/2001 | Burns | |
| 6,400,687 B1 | 6/2002 | Davison et al. | |
| 6,480,753 B1 | 11/2002 | Calder et al. | |
| 6,591,423 B1 | 7/2003 | Campbell | |
| 6,594,826 B1 * | 7/2003 | Rao et al. | 725/95 |
| 6,609,253 B1 | 8/2003 | Swix et al. | |
| 6,631,118 B1 * | 10/2003 | Jones | 370/252 |
| 6,647,411 B2 | 11/2003 | Towell | |
| 6,717,507 B1 | 4/2004 | Bayley et al. | |
| 6,741,563 B2 | 5/2004 | Packer | |
| 6,757,796 B1 | 6/2004 | Hofmann | |
| 6,771,661 B1 | 8/2004 | Chawla et al. | |
| 6,796,787 B2 | 9/2004 | Okada | |
| 6,810,528 B1 * | 10/2004 | Chatani | 725/109 |
| 6,816,903 B1 | 11/2004 | Rakoshitz et al. | |
| 6,839,052 B1 | 1/2005 | Kramer | |
| 6,870,463 B2 | 3/2005 | Dresti et al. | |
| 6,889,382 B1 * | 5/2005 | Anderson | 725/10 |
| 6,961,341 B1 | 11/2005 | Krishnan | |
| 6,973,066 B2 | 12/2005 | Gutowski | |
| 7,000,246 B1 | 2/2006 | Takao | |
| 7,065,586 B2 | 6/2006 | Ruttenberg et al. | |
| 7,151,939 B2 | 12/2006 | Sheynblat | |
| 7,277,894 B2 * | 10/2007 | Kondo et al. | 1/1 |
| 7,284,201 B2 | 10/2007 | Cohen-Solal | |
| 7,437,073 B2 | 10/2008 | Kim et al. | |
| 7,512,650 B2 | 3/2009 | Richardson | |
| 7,519,703 B1 | 4/2009 | Stuart et al. | |
| 2001/0031633 A1 | 10/2001 | Tuomela et al. | |
| 2001/0043571 A1 | 11/2001 | Jang et al. | |
| 2002/0002708 A1 | 1/2002 | Arye | |
| 2002/0018645 A1 | 2/2002 | Nakamatsu et al. | |
| 2002/0046099 A1 | 4/2002 | Frengut et al. | |
| 2002/0080721 A1 | 6/2002 | Tobagi et al. | |
| 2002/0083443 A1 | 6/2002 | Eldering et al. | |
| 2002/0104087 A1 | 8/2002 | Schaffer et al. | |
| 2002/0108127 A1 | 8/2002 | Lew | |
| 2002/0133830 A1 | 9/2002 | Kim | |
| 2002/0144259 A1 | 10/2002 | Gutta et al. | |
| 2002/0164987 A1 | 11/2002 | Caronni et al. | |
| 2002/0178440 A1 | 11/2002 | Agnihotri et al. | |
| 2002/0194586 A1 | 12/2002 | Gutta et al. | |
| 2003/0002642 A1 | 1/2003 | Jorasch et al. | |
| 2003/0002862 A1 * | 1/2003 | Rodriguez et al. | 386/125 |
| 2003/0004743 A1 | 1/2003 | Callegari | |
| 2003/0028872 A1 | 2/2003 | Milovanovic et al. | |
| 2003/0046704 A1 * | 3/2003 | Laksono et al. | 725/96 |
| 2003/0061619 A1 * | 3/2003 | Giammaressi | 725/95 |
| 2003/0067554 A1 | 4/2003 | Klarfeld | |
| 2003/0088878 A1 | 5/2003 | Rogers | |
| 2003/0118029 A1 | 6/2003 | Maher, III et al. | |
| 2003/0135544 A1 | 7/2003 | Richardson | |
| 2003/0154242 A1 | 8/2003 | Hayes et al. | |
| 2003/0154246 A1 | 8/2003 | Ollikainen | |
| 2003/0236745 A1 | 12/2003 | Hartsell et al. | |
| 2004/0009761 A1 | 1/2004 | Money et al. | |
| 2004/0013119 A1 | 1/2004 | MeLampy et al. | |
| 2004/0071085 A1 | 4/2004 | Shaham et al. | |
| 2004/0078814 A1 | 4/2004 | Allen | |
| 2004/0125757 A1 | 7/2004 | Mela et al. | |
| 2004/0183749 A1 | 9/2004 | Vertegaal | |
| 2004/0221304 A1 | 11/2004 | Sparrell et al. | |
| 2004/0226034 A1 | 11/2004 | Kaczowka et al. | |
| 2004/0255336 A1 | 12/2004 | Logan | |
| 2004/0264563 A1 | 12/2004 | Inoue et al. | |
| 2004/0268407 A1 | 12/2004 | Sparrell et al. | |
| 2004/0268410 A1 | 12/2004 | Barton | |
| 2005/0002662 A1 | 1/2005 | Arpa et al. | |
| 2005/0007965 A1 | 1/2005 | Hagen et al. | |
| 2005/0022239 A1 * | 1/2005 | Meuleman | 725/46 |
| 2005/0024543 A1 | 2/2005 | Ramaswamy et al. | |
| 2005/0039219 A1 | 2/2005 | Cooper et al. | |
| 2005/0066026 A1 | 3/2005 | Chen et al. | |
| 2005/0081252 A1 | 4/2005 | Chefalas | |
| 2005/0097595 A1 | 5/2005 | Lipsanen et al. | |
| 2005/0108328 A1 | 5/2005 | Berkeland et al. | |
| 2005/0120113 A1 | 6/2005 | Bunch et al. | |
| 2005/0144640 A1 | 6/2005 | Fritsch et al. | |
| 2005/0183110 A1 | 8/2005 | Anderson | |
| 2005/0266825 A1 | 12/2005 | Clayton | |
| 2006/0013266 A1 | 1/2006 | Vega-Garcia et al. | |
| 2006/0025151 A1 | 2/2006 | Karaoguz et al. | |
| 2006/0028185 A1 | 2/2006 | Hernandez et al. | |
| 2006/0056389 A1 | 3/2006 | Monk et al. | |
| 2006/0095398 A1 | 5/2006 | Bhaskaran | |
| 2006/0114360 A1 | 6/2006 | Kortum et al. | |
| 2006/0125959 A1 | 6/2006 | Yoshizawa et al. | |
| 2006/0174266 A1 | 8/2006 | Gatto et al. | |
| 2006/0179466 A1 * | 8/2006 | Pearson et al. | 725/109 |
| 2006/0184780 A1 | 8/2006 | Yamada et al. | |
| 2006/0195866 A1 * | 8/2006 | Thukral | 725/34 |
| 2006/0204214 A1 | 9/2006 | Shah et al. | |
| 2006/0221826 A1 | 10/2006 | Bedingfield, Sr. et al. | |
| 2006/0222015 A1 | 10/2006 | Kafka et al. | |
| 2006/0222110 A1 | 10/2006 | Kuhtz | |
| 2006/0225106 A1 | 10/2006 | Bedingfield, Sr. | |
| 2006/0251116 A1 | 11/2006 | Bedingfield, Sr. et al. | |
| 2007/0133603 A1 | 6/2007 | Weaver et al. | |
| 2007/0136772 A1 | 6/2007 | Weaver et al. | |
| 2007/0169142 A1 * | 7/2007 | Claassen et al. | 725/10 |

OTHER PUBLICATIONS

RFID News, "Baggage Direct-Uses Tag-It, The World's First RFID-based Baggage Delivery System", Nov. 2000 Texas Instruments, 12 pages.

U.S. Appl. 11/300,061, filed Dec. 14, 2005.
U.S. Appl. 11/300,125, filed Dec. 14, 2005.
U.S. Appl. 11/300,212, filed Dec. 14, 2005.

* cited by examiner

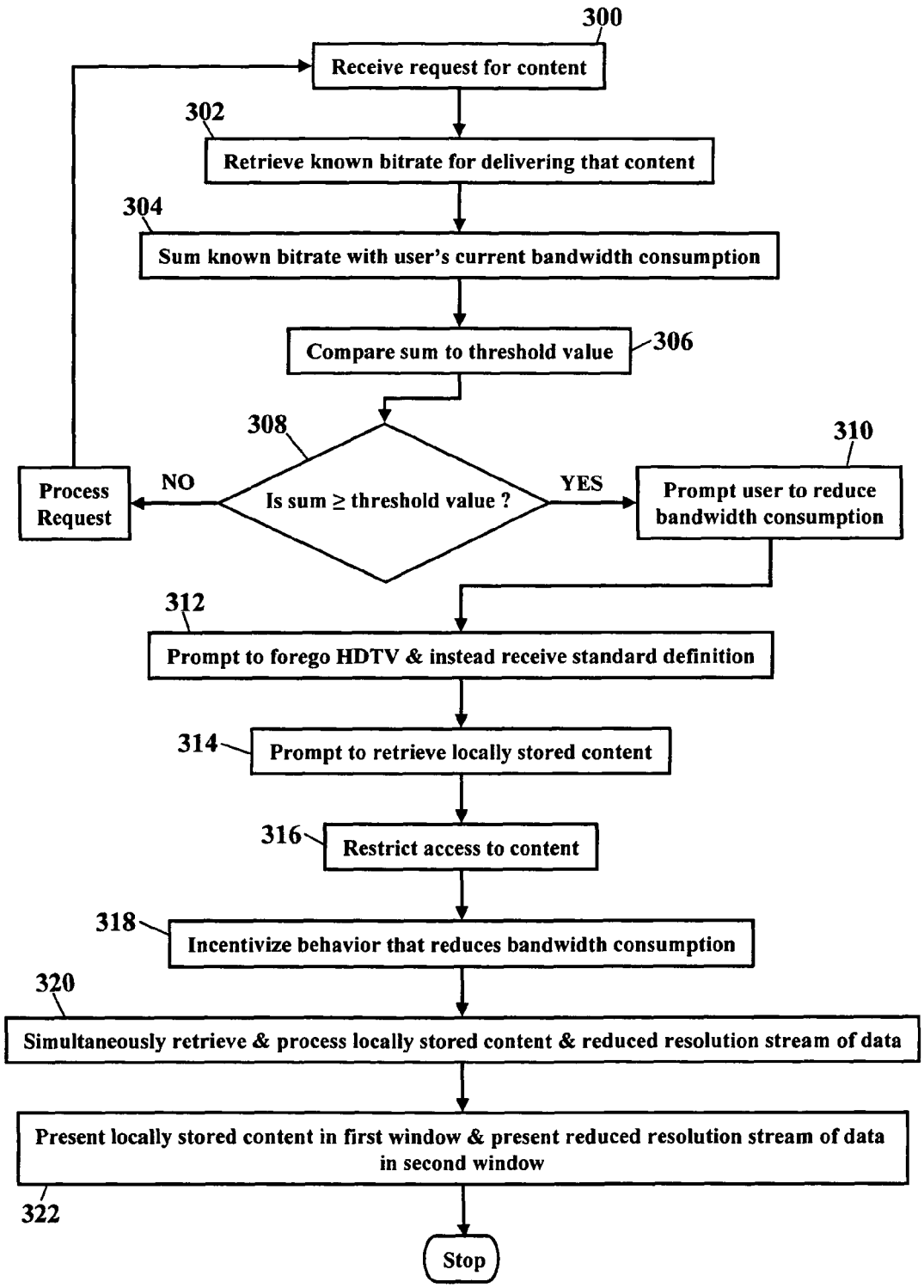

METHODS, SYSTEMS, AND DEVICES FOR BANDWIDTH CONSERVATION

CROSS-REFERENCE TO RELATED APPLICATIONS

This application claims the benefit of U.S. Provisional Patent Application 60/713,487, filed Sep. 1, 2005 and entitled "TV Bandwidth Conservation Based On User Presence Detection Using Remote Control," and incorporated herein by reference in its entirety. This application also relates to the commonly assigned and concurrently filed U.S. application Ser. No. 11/298,402, entitled "Methods, Systems, and Devices for Bandwidth Conservation" (BS050230), and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to presence detection in such systems.

Bandwidth is becoming a problem in the communications industry. As subscribers demand more and more content, higher definition services, interactive services, and data services, the existing network infrastructure has trouble supplying adequate bandwidth. The industry is hard at work identifying new ways of increasing bandwidth. The industry is also striving to reduce wasted bandwidth.

An "always on" set-top box is one example of wasted bandwidth. An "always on" set-top box continually receives content, even while no one is watching television. When the set-top box remains powered "on" and tuned to a channel, the set-top box consumes bandwidth. Often times, however, that channel is not watched and bandwidth is wasted. Many cable subscribers, for example, forget to, or are unable to, turn "off" their set-top box. Many subscribers power "off" the television, yet the set-top box remains powered "on" and receiving content. It's not uncommon for a set-top box to continually receive a video stream while the subscriber sleeps for hours and/or vacations for days. No one is watching the content, yet the set-top box is consuming network bandwidth. Because communications networks need to efficiently utilize bandwidth, there is a need in the art for reducing bandwidth consumption.

SUMMARY

The aforementioned problems, and other problems, are reduced, according to exemplary embodiments, by methods, systems, and devices that conserve bandwidth in communications networks. These exemplary embodiments describe how subscribers may be incentivized to reduce their bandwidth consumption. When a customer, subscriber, or generally "user" requests content that exceeds their allotted bandwidth, the exemplary embodiments will provide that user an incentive to requesting less bandwidth-intensive content. Similarly, should a communications network experience overall, regional, or localized congestion, the exemplary embodiments will again incentivize the user to relieve that congestion. For example, should the communications network experience congestion, an HDTV subscriber may be offered an incentive to accept a standard definition television experience. Another incentive may offer special pricing to view a movie that has been preloaded into local memory, thus relieving network congestion. Whatever the incentive, exemplary embodiments shed network traffic without offending the subscriber.

Exemplary embodiments conserve bandwidth. A user's bandwidth consumption is monitored and compared to a threshold value. When the user's bandwidth consumption equals or exceeds the threshold value, then the user's behavior is incentivized to reduce bandwidth consumption.

The exemplary embodiments also include a device that conserves bandwidth. The device comprises a processor receiving inputs via a user interface. The processor monitors a user's bandwidth consumption and compares the user's bandwidth consumption to a threshold value. When the user's bandwidth consumption equals or exceeds the threshold value, then the processor executes instructions that incentivize behavior to reduce the user's bandwidth consumption.

The exemplary embodiments also include a computer program product for conserving bandwidth. The computer program product comprises a computer-readable medium and a presence detection application stored on the computer-readable medium. The presence detection application comprises computer code for performing the steps: i) monitoring a user's bandwidth consumption; ii) comparing the user's bandwidth consumption to a threshold value; and iii) when the user's bandwidth consumption equals or exceeds the threshold value, then incentivizing behavior that reduces the user's bandwidth consumption.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein:

FIG. 21 is a flowchart illustrating a method of conserving bandwidth, according to more exemplary embodiments.

DETAILED DESCRIPTION

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that conserve bandwidth in communications networks. These exemplary embodiments describe how subscribers may be incentivized to reduce their bandwidth consumption. When a customer, subscriber, or generally "user" requests content that exceeds their allotted bandwidth, the exemplary embodiments will provide that user an incentive to requesting less bandwidth-intensive content. Similarly, should a communications network experience overall, regional, or localized congestion, the exemplary embodiments will again incentivize the user to relieve that congestion. For example, should the communications network experience congestion, an HDTV subscriber may be offered an incentive to accept a standard definition television experience. Another incentive may offer special pricing to view a movie that has been preloaded into local memory, thus relieving network congestion. Whatever the incentive, exemplary embodiments shed network traffic without offending the subscriber.

Figure 1:
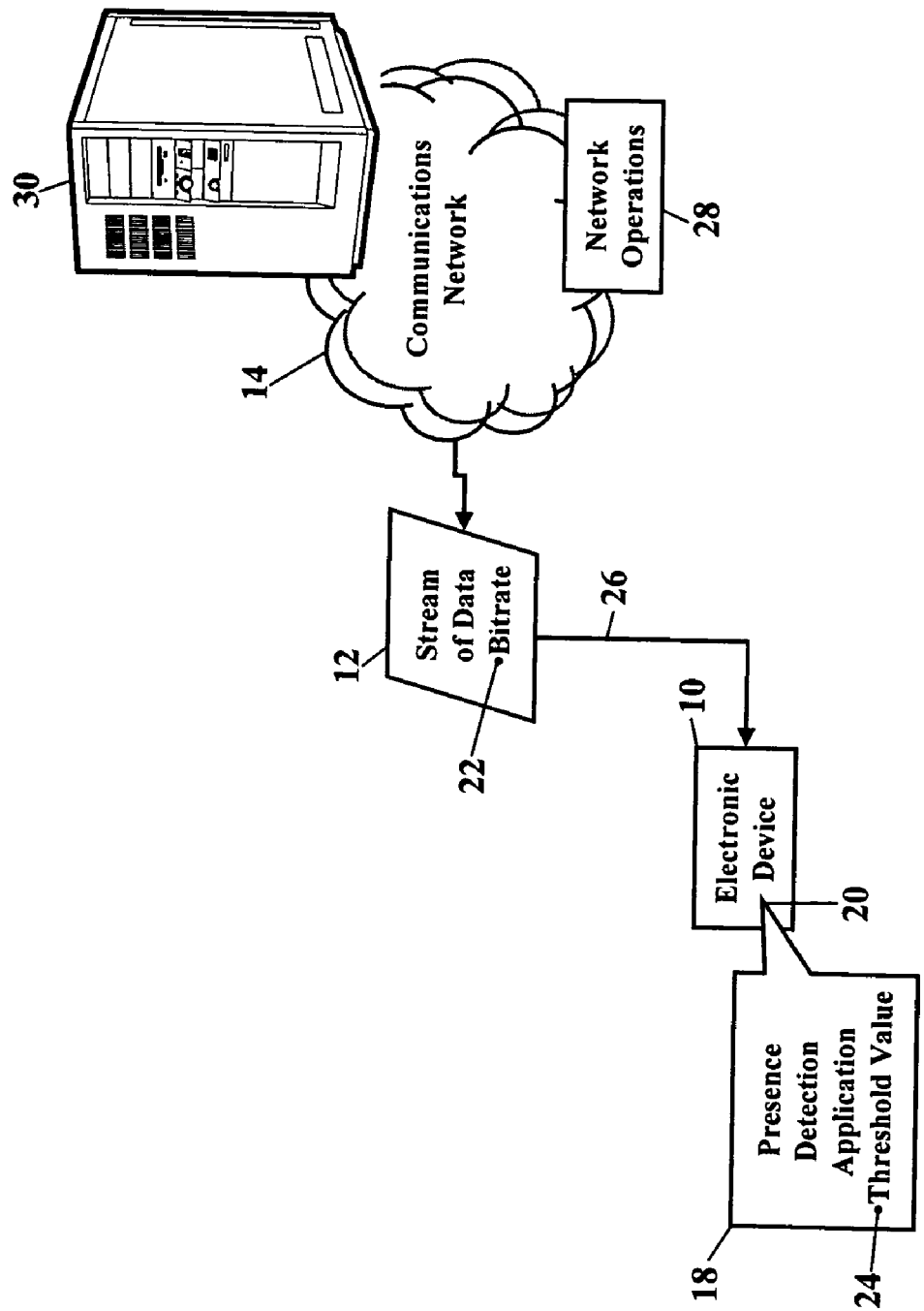
FIG. 1 is a schematic illustrating an operating environment, according to exemplary embodiments.

FIG. 1 is a simplified schematic illustrating an operating environment, according to exemplary embodiments. FIG. 1 shows an electronic device 10 receiving a stream 12 of data via a communications network 14. The electronic device 10 can be any device, such as a set-top box, a television, or an integrated television and set-top box. The electronic device 10 may also be an analog/digital recorder, CD/DVD player/recorder, audio equipment, receiver, tuner, and/or any other consumer electronic device. The electronic device 10 may also include any computer, peripheral device, camera, modem, storage device, telephone, personal digital assistant, and/or mobile phone. The stream 12 of data may be any RF and/or digital content, such as television/cable programming, mpg streams, or any other content. The communications network 14 may be a cable network operating in the radio-frequency domain and/or the Internet Protocol (IP) domain. The communications network 14, however, may also include a distributed computing network, such as the Internet (sometimes alternatively known as the "World Wide Web"), an intranet, a local-area network (LAN), and/or a wide-area network (WAN). The communications network 14 may include coaxial cables, copper wires, fiber optic lines, and/or hybrid-coaxial lines. The communications network 14 may even include wireless portions utilizing any portion of the electromagnetic spectrum and any signaling standard (such as the IEEE 802 family of standards).

The electronic device 10 monitors and conserves bandwidth. As the electronic device 10 receives the stream 12 of data, the electronic device 10 monitors the bandwidth consumed by the stream 12 of data. The electronic device 10 stores a presence detection application 18 in memory 20. The presence detection application 18 is a computer program that monitors the bitrate 22 of the stream 12 of data. The bitrate 22 may be measured in any units, yet the bitrate 22 is typically expressed as bits per second. As the presence detection application 18 measures the bitrate 22, the presence detection application 18 compares that birate 22 to a threshold value 24. The threshold value 24 represents a maximum number of bits per second that may be received by the electronic device 10. When the user's actual or predicted bandwidth consumption equals or exceeds the threshold value, then the presence detection application 18 incentivizes behavior that reduces the user's bandwidth consumption. As the following paragraphs will explain, the user is provided incentives to reduce or relieve congestion in the communications network 14.

The threshold value 24 may be compared to a "speed limit." The threshold value 24 may represent a maximum number of bits per second that may be received by the electronic device 10. The threshold value 24, alternatively or additionally, may represent a maximum number of bits per second that may be delivered or carried by a communications link 26 (such as a digital subscriber line, coaxial cable, fiber optic line/cable, and/or wireless interface). The threshold value 24, alternatively or additionally, may represent a maximum number of bits per second assigned to the communications link 26 by a network operations center 28 or server 30. The threshold value 24, then, may represent a physical constraint or an allocation. However the threshold value 24 is defined, the presence detection application 18 polices the threshold value 24. When the presence detection application 18 determines that actual or predicted bandwidth consumption equals or exceeds the threshold value 24, then the presence detection application 18 provides incentives to reduce and/or to reclaim bandwidth.

Figure 2:
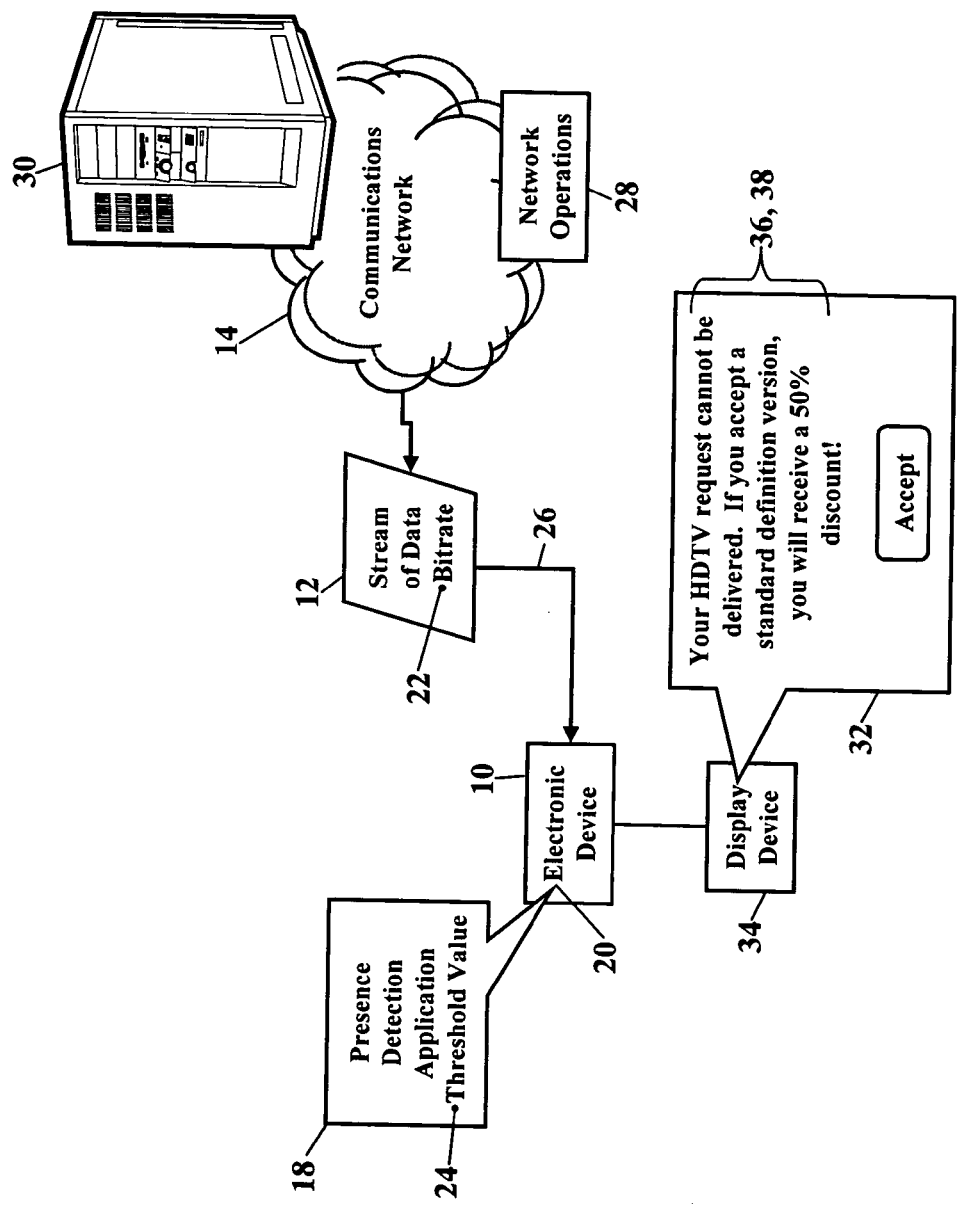
FIG. 2 is a schematic illustrating an incentive, according to exemplary embodiments.

FIG. 2 is a schematic illustrating one such incentive, according to exemplary embodiments. When the presence detection application 18 determines that the user's actual or predicted bandwidth consumption equals or exceeds the threshold value 24, then the presence detection application 18 presents a prompt 32. This prompt 32 urges the user to accept a standard definition stream of data. That is, the prompt 32 asks the user to forego a high definition stream of data (e.g., an HDTV bitrate). The prompt 32, instead, seeks authorization or permission to receive a reduced resolution stream of data (such as a standard definition television bitrate). The presence detection application 18 may visually and/or audibly cause a display device 34 (such as a television or monitor) to produce the prompt 32. The prompt 32, for example, may visually and/or audibly present a message 36, notifying the user that the selected content cannot be delivered in an HDTV format. The message 36, instead, notifies the user that only a standard definition experience can be delivered or received.

The prompt 32 may include an incentive 38. This incentive 38 induces the user to accept the prompt 32 and, thus, reduce the user's bandwidth consumption. The incentive 38 could include a monetary value, a reduced charge, a complimentary product or service, or some other offer. Continuing with the HDTV example, the user may request that HDTV content during a peak or nearly-peak time in network activity. The stream 12 of data, in the HDTV format, requires about quadruple the bitrate as the standard definition format. When the communications network 14 is congested, or is predicted to be congested, the network operations center 28 or the server 30 may instruct the presence detection application 18 to process the prompt 32. The prompt 32 informs the user that the standard definition format may be received or viewed for a lower price, for free, or for some other offer. Because the goal is relieving network congestion, the incentive 38 should be configured to ensure acceptance. The prompt 32, or course, could forego any incentive, and the user receives, by default, a standard definition experience (e.g., a standard definition television bitrate). If the user's requested content cannot be fulfilled, in other words, the user receives, by default, a reduced resolution version that will not exceed the threshold value 24.

Figure 3:
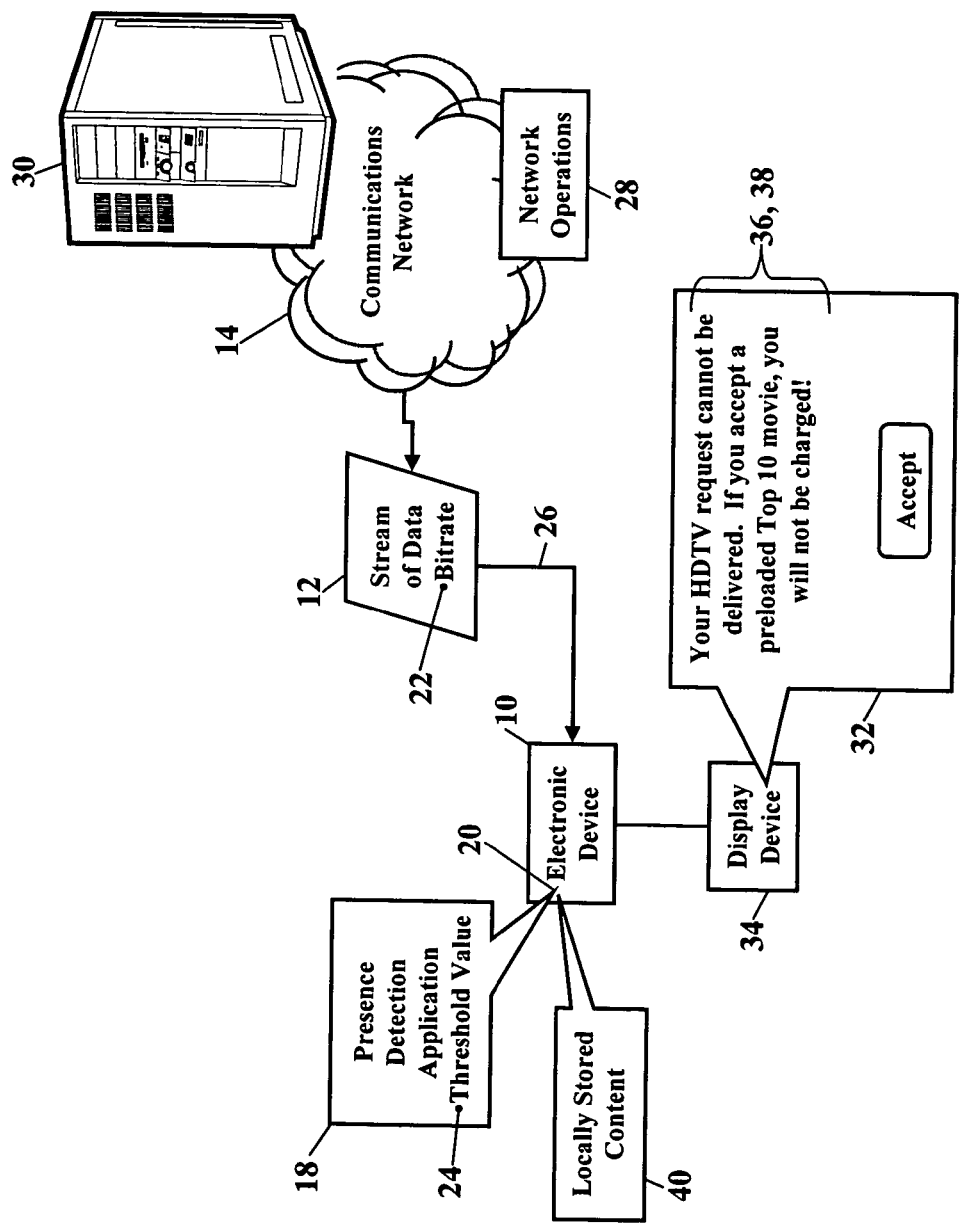
FIG. 3 is a schematic illustrating another incentive, according to more exemplary embodiments.

FIG. 3 is a schematic illustrating another incentive, according to more exemplary embodiments. When the user's actual or predicted bandwidth consumption equals or exceeds the threshold value 24, the presence detection application 18 again presents the prompt 32. Here, however, the prompt 32 urges the user to accept locally stored content 40. That is, the user is asked to accept alternative content that is not contemporaneously received via the communications network 14. The locally-stored content 40 may be a movie, music, game, slide show, family photos, or any other file (having any format or extension). The locally-stored content 40 still presents audio and/or video content, yet the locally-stored content 40 is not drawing or requiring bandwidth from the communications network 14. The locally-stored content 40 may be preselected and preloaded/downloaded by a content provider, a service provider, or by a network operator. The locally-stored content 40 may also be selected and configurable by the user. The locally-stored content 40 may be retrieved from some other local memory destination, such as an auxiliary DVD, digital recorder, hard drive, or other locally-networked component. Perhaps the alternative content is a movie that was preloaded into the memory 20 during off-peak hours. Perhaps the alternative content is a movie retrieved from a DVD player, VHS player, or other auxiliary component. Whatever the alternative content, that alternative content need not be downloaded from the communications network 14 via the communications link 26. After all, the presence detection application 18 presents the prompt 32 to relieve congestion in the communications network 14. The prompt 32 may again include the incentive 38 to induce acceptance and to reduce the user's bandwidth consumption.

Figure 4:
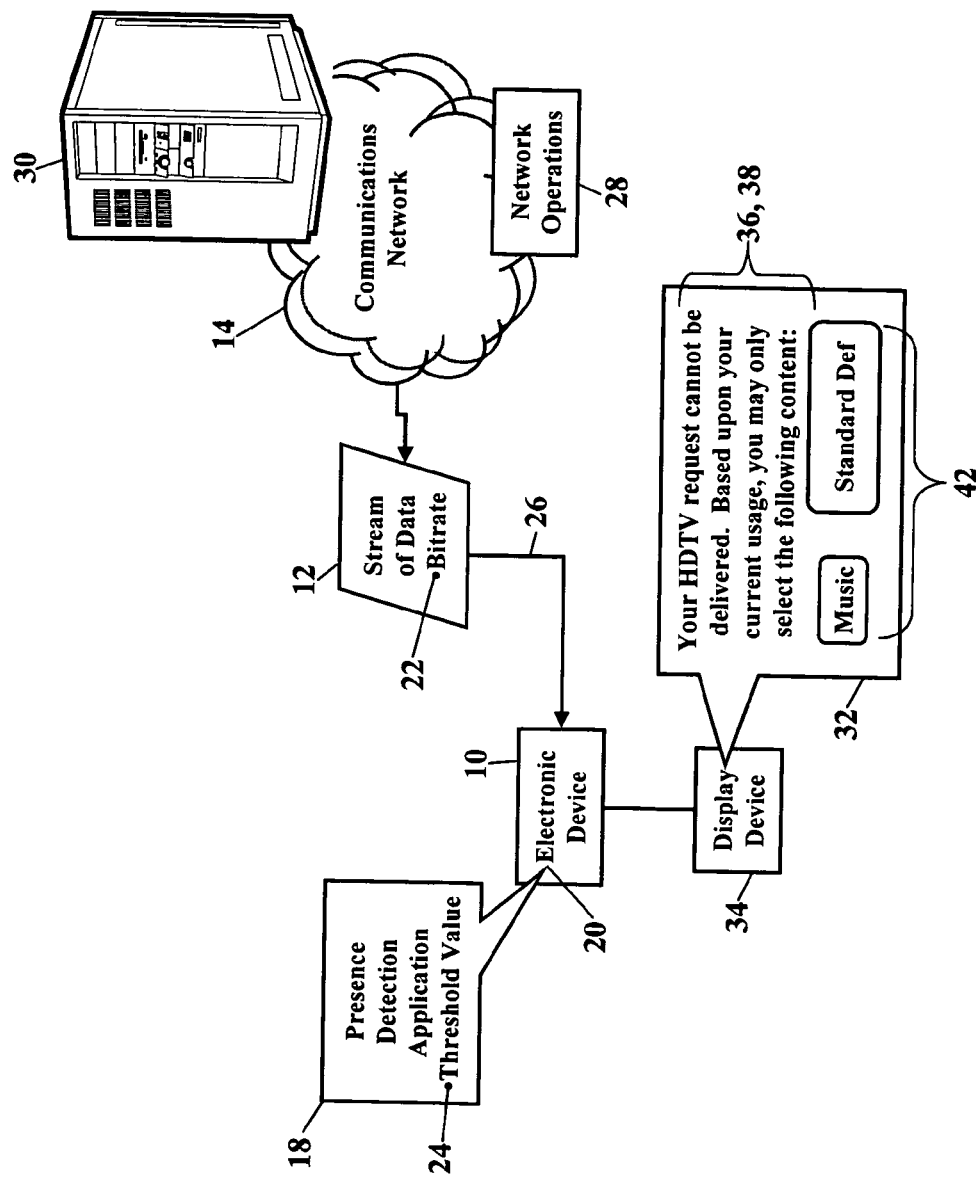
FIG. 4 is a schematic illustrating a restriction in service, according to even more exemplary embodiments.

FIG. 4 is a schematic illustrating a restriction in service, according to even more exemplary embodiments. Here, when the user's actual or predicted bandwidth consumption equals or exceeds the threshold value 24, the presence detection application 18 restricts the user's access to content. The user is restricted to receiving content that reduces the user's actual or predicted bandwidth consumption. The user may additionally or alternatively be restricted to receiving content that reduces network congestion. Suppose, again, the user requests a high definition stream of data (e.g., an HDTV bitrate). Yet this high definition stream of data may exceed the threshold value 24. The presence detection application 18, then, will deny the user's request. The presence detection application 18 produces the prompt 32, and the prompt 32 informs the user that their requested content cannot be delivered. The prompt 32 may require selection of other content. The prompt 32 may provide a menu 42 of content that can be delivered within the threshold value 24. The menu 42 of content presents a selection of alternative content that keeps the total bitrate equal to or below the threshold value 24. The menu 42 of content, for example, may restrict the user to standard definition streams of data. The menu 42 of content may restrict the user to reduced resolution streams of data (e.g., picture-in-picture formats, "grainy" picture quality, or black and white versions). The menu 42 of content may restrict the user to audio-only content (e.g., music and soundtracks). The menu 42 of content may also restrict the user to locally-stored content (as discussed above). Whatever the alternative content, the presence detection application 18 restricts the user's selections such that the threshold value 24 is enforced.

Figure 5:
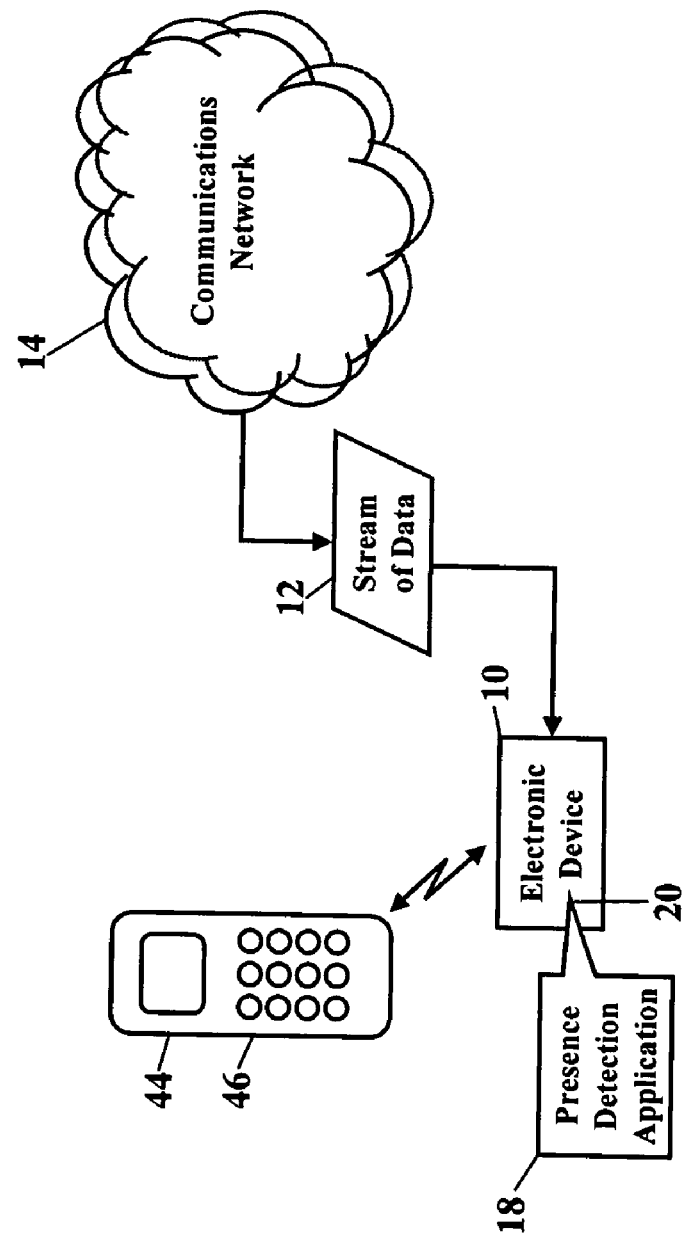
FIG. 5 is a schematic illustrating the prediction of a user's presence, according to exemplary embodiments.

FIG. 5 is a schematic illustrating the prediction of a user's presence, according to exemplary embodiments. Here the presence detection application 18 detects or monitors the physical presence of the user. The user is generally a person in the vicinity of the electronic device 10 (such as in the same room) and who is watching, listening to, or otherwise experiencing a movie, game, TV program, or other content represented by the stream 12 of data. The user may be a customer, a subscriber, a viewer, a listener, or any other person experiencing content delivered to the electronic device 10. The presence detection application 18 monitors or detects when the user is present and, thus, watching, listening to, or otherwise experiencing the content represented by the stream 12 of data. If the user is experiencing the stream 12 of data, then the bandwidth allocated to that stream 12 of data is maintained. If, however, the user is not watching or otherwise experiencing the delivered stream 12 of data, then perhaps bandwidth is being wasted. The presence detection application 18, then, may (or may not) conserve bandwidth.

The presence detection application 18 predicts the presence of the user. The presence detection application 18 monitors inputs to the electronic device 10 and predicts when the user is present, thus justifying the allocated bandwidth. The presence detection application 18, for example, monitors inputs received via a user interface 44. The electronic device 10 includes the user interface 44, and the user interface 44 provides direct or menu-driven access to functions, features, and settings for the electronic device 10. The user interface 44, for example, may be a keyboard, a keypad, control panel, soft-touch control buttons, voice-activated or voice-recognition software, graphical user interface, or any other means for inputting commands to the electronic device 10. Although the user interface 44 may be any means for inputting commands, FIG. 5 illustrates the user interface 44 as a wireless remote control 46. The user interface 44 may include any combination of alphabetic, numeric, and iconic character buttons. The user interface 44 may also include cursor movement buttons that enable the user to scroll and to sequence through menu options. If the user is making inputs via the user interface 44, then those inputs are a positive indication that the user is present and the allocated bandwidth is justified. If, however, no inputs are received over a period of time, then, as the following paragraphs explain, the presence detection application 18 may or may not infer that the user is or is not present. If the user is not watching, listening to, or otherwise experiencing the stream 12 of data, then the allocated bandwidth for the stream 12 of data may be reduced to conserve network resources.

Figure 6:
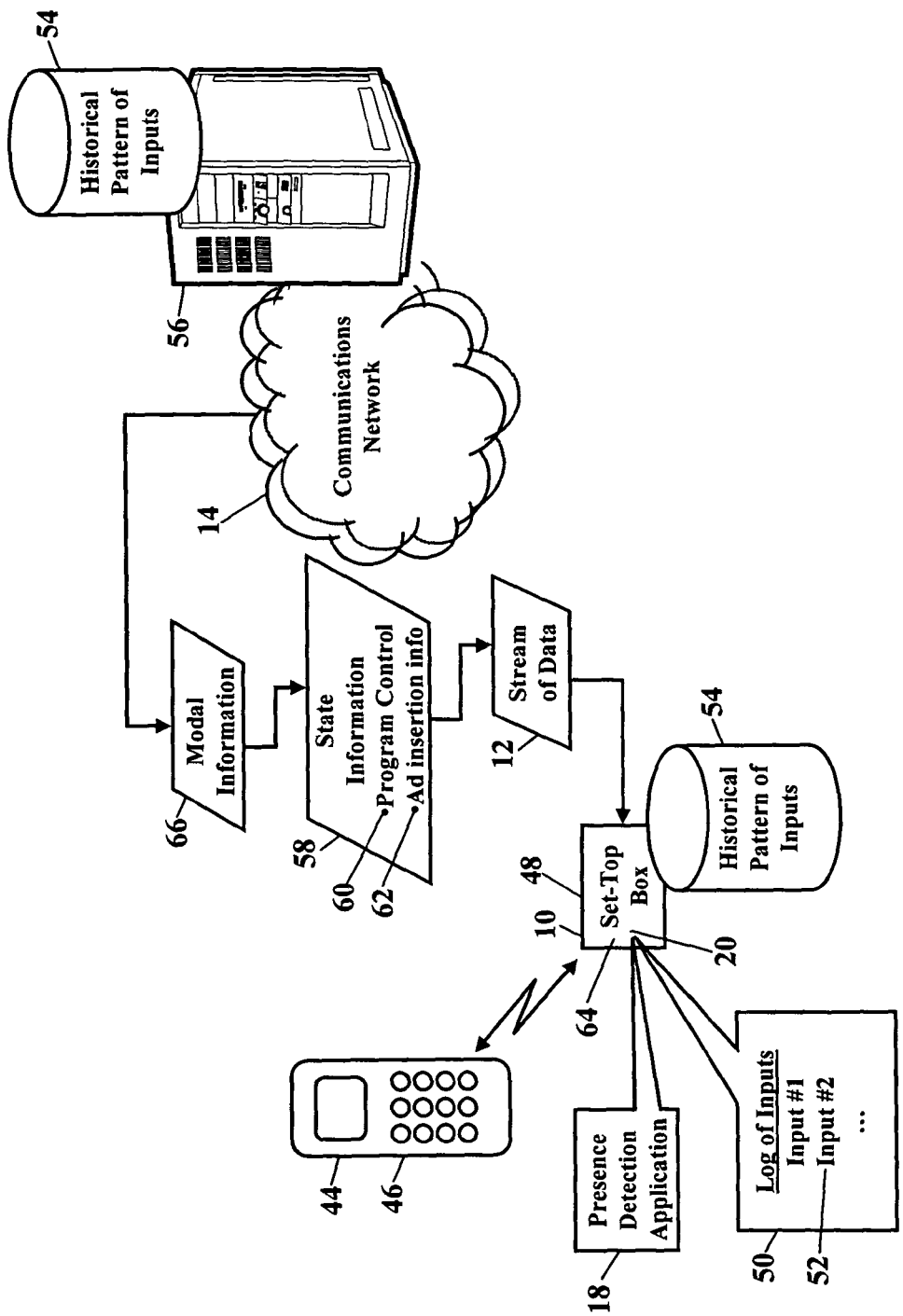
FIG. 6 is a more detailed schematic illustrating the prediction of the user's presence, according to exemplary embodiments.

FIG. 6 is a more detailed schematic illustrating the prediction of the user's presence, according to exemplary embodiments. Here the electronic device 10 is shown as a set-top box 48. The set top box 48 receives and decodes the stream 12 of data. The presence detection application 18 is an algorithm stored in the memory 20 of the set top box 48, and the presence detection application 18 monitors or detects when the user is present. If the presence detection application 18 infers that the user is present, then the presence detection application 18 maintains the full-resolution of the stream 12 of data. If, however, the presence detection application 18 infers that the user is not watching, listening to, or otherwise experiencing the stream 12 of data, then the allocated bandwidth for the stream 12 of data may be reduced to conserve network resources.

As FIG. 6 illustrates, the presence detection application 18 monitors inputs received via the user interface 44. As the user makes channel changes, cursor movements, volume commands, and other inputs via the user interface 44, the presence detection application 18 accumulates those inputs in the memory 20. Again, while the user interface 44 may be a keyboard, keypad, control panel or other means for inputting commands, FIG. 6 illustrates the user interface 44 as the remote control 46. As each input to the remote control 46 is received, the input is stored in the memory 20. The inputs may be stored as a log 50, with each entry 52 describing at least the input and the time the input was entered, received, or logged. The inputs may be sequentially stored throughout time. More likely, however, the inputs are stored during any period of time from seconds to years, depending on the amount of available memory. When the memory allocated to the log 50 is filled, the log 50 would sequentially replace the earliest entry with the newest entry. The user may even configure the memory 20 and the log 50 to select the amount of memory allocated to the log 50, and the presence detection application 18 may prompt the user to increase memory allocation when the log 50 is nearly full.

The presence detection application 18 may also predict presence using historical patterns. These historical patterns tell the presence detection application 18 when to expect activity at the user interface 44. When activity is expected, and inputs to the user interface 44 are received, then the presence detection application 18 may infer the user is present, thus justifying the allocated bandwidth. If, however, no inputs are received when expected, then perhaps the user is not present and bandwidth is being wasted.

As FIG. 6 also illustrates, the presence detection application 18 may access a historical pattern 54 of inputs. The historical pattern 54 of inputs may be stored in a database that is locally maintained in the memory 20 of the electronic device 10. The historical pattern 54 of inputs may be additionally or alternatively be stored at a remote location, such as a remote server 56 communicating with the electronic device 10 via the communications network 14. However the historical pattern 54 of inputs is accessed, the historical pattern 54 of inputs stores historical information describing behavioral patterns of inputs to the user interface 44. The historical pattern 54 of inputs may be associated with the individual user, such as a learned pattern of input events or some interval of time describing historical use associated with the user. The historical pattern 54 of inputs, however, may additionally or alternatively be a pattern of inputs collected from a sample of users or collected from a population of users across a node, branch, region, or other grouping. The presence detection application 18 may even itself analyze the log 50 of inputs, looking for any patterns of usage.

As the user makes inputs via the user interface 44 (e.g. the remote control 46), the presence detection application 18 may analyze those inputs for trends. The user, for example, may have a history of making inputs after a transition in content. When content or programming transitions to an advertisement, the user may have a history of making channel or content changes after the transition. If the content transitions to an advertisement, but no inputs are received, then perhaps the user is not present and bandwidth is being wasted. The historical pattern 54 of inputs may, likewise, also indicate that, at a certain time of day, the user interface 44 usually receives inputs. The user, for example, may "surf" content near the top of the hour, when content providers typically transition programming offerings. If that time of day passes with little or no inputs, then perhaps again the user is not present and bandwidth is being wasted. The presence detection application 18 may thus predict presence of the user by comparing historical patterns to actual inputs received via the user interface 44.

The presence detection application 18 may also predict presence using state information 58. This state information 58 describes a current state of the stream 12 of data being received at the electronic device 10. The state information 58 describes, at any particular moment in time, the content represented by the stream 12 of data. The state information 58, for example, may describe programming timing and indicate that the stream 12 of data is currently near the middle (or any other point) of a movie, TV program, song, or other content. The state information 58 may also indicate top of the hour, bottom of the hour, or other advertisement insertion slots. The state information 58 may be transmitted by a service provider, content provider, head end, server, or any other entity and received at the electronic device 10 via the communications network 14. The state information 58 may be transmitted with the stream 12 of data, or the state information 58 may be separately transmitted as a timing signal. However the state information 58 is received, the presence detection application 18 may receive and analyze this state information 58 when predicting presence.

The state information 58 may include a program control information signal 60. The program control information signal 60 may be delivered with programming and other content received via the communications network 14. The program control information signal 60 may be transmitted by a content provider, a network operations center, a headend, or any other entity. The program control information signal 60 may contain a description of the content or packages of content, such as channel number, program title, program length, program category, and start/end times. The program control information signal 60 may also contain menu content, such as menu locations for messages, graphics and video, menu colors, text fonts, sizes, and styles, and other menu information. The program control information signal 60 may also contain commands for the electronic device 10 (e.g., the set top box 48) and other information relevant to signal transmission.

As FIG. 6 also illustrates, the state information 58 may additionally or alternatively include advertisement insertion information 62. The advertisement insertion information 62 is used when inserting an advertisement into the stream 12 of data. The advertisement insertion information 62 may be inserted at the headend and sent via the communications network 14 or embedded in the stream 12 of data (or other program signal). The advertisement insertion information 62, for example, may include "Q-tones" or other information that identifies a point in the stream 12 of data in which an advertisement is inserted. The presence detection application 18 may interface with an MPEG decoder 64 that is capable of detecting, decoding, and/or or hearing MPEG Q-tones within the stream 12 of data. As those of ordinary skill in the art understand, the Q tone provides the MPEG decoder 64 and/or the presence detection application 18 with an advance indication of a point in the content where an advertisement is inserted. The Q tone provides a set time (e.g., 30 or 60 seconds) after which the advertisement should begin. Because Q-tones are well understood by those of ordinary skill in the art, Q-tones will not be further explained.

The presence detection application 18 may also predict presence using modal information 66. This modal information 66 describes a current mode of operation for the electronic device 10. The modal information 66, for example, may indicate that the electronic device 10 is currently operating in a broadband mode (e.g. receiving the stream 12 of data via a broadband connection to the communications network 14). The modal information 66 could additionally or alternatively indicate the electronic device 10 is operating in a broadcast mode. The electronic device 10, for example, may be wirelessly receiving the stream 12 of data via an AM/FM/VHF/UHF transmission, via a CDMA/TDMA/GSM or variant signaling standard, via an industrial, scientific, and medical band (ISM) (e.g., BLUETOOTH®) transmission, via a satellite transmission, via any of the IEEE 802 family of standards, or via any portion of the electromagnetic spectrum. The modal information 66 may additionally or alternatively indicate the electronic device 10 is operating in an auxiliary mode, such as receiving auxiliary content from a DVD/CD-ROM, VHS, digital recorder, or other memory storage component. The modal information 66 may additionally or alternatively indicate the electronic device 10 is operating in a gaming mode and, thus, receiving and/or visually or audibly presenting a game. Whatever the mode of operation, the presence detection application 18 may use this modal information 66 when predicting the presence of the user.

The presence detection application 18 then uses any of the above-described information sources to predict presence. The presence detection application 18 receives and analyzes the inputs received via the user interface 44, the historical pattern 54 of inputs, the state information 58, and/or the modal information 66. The presence detection application 18 then intelligently predicts whether the user is currently present and experiencing the stream 12 of data.

An example provides additional explanation. Suppose the electronic device 10 operates in a broadband mode of operation and is receiving content. The state information 58 indicates the stream 12 of data is nearing the middle of a three-hour movie. The state information 58 also includes timing information indicating that a top of the hour is approaching. At the top of the hour, the presence detection application 18 knows to expect inputs to the user interface 44, based on trends from the historical pattern 54 of inputs. The historical pattern 54 of inputs, for example, indicates that the user, or a group of users, commonly "surfs" or makes channel changes at the top of the hour, when programming transitions to advertisements. Because the user is in the middle of a commercial-free movie, however, the user may not normally "surf" content at the top of the hour. If the presence detection application 18 heeded the historical information, the lack of inputs at the top of the hour could erroneously indicate that the user is not present and that bandwidth is being wasted.

Yet the presence detection application 18 is more intelligent. Because the user is in the middle of a movie, the presence detection application 18 may ignore historical information describing top-of-the-hour inputs. As the presence detection application 18 builds the log 50 of inputs, each entry 52 may be correlated with the corresponding state information 58 and with the corresponding modal information 66. Such information may describe the operation of the electronic device 10, such as whether the input was made after transition to a commercial, during a commercial-free movie, or during a gaming mode. If the state information 58 indicates the electronic device 10 is receiving a movie without inserted ads, the presence detection application 18 may decide to ignore historical information. That is, if the state information 58 does not include ad insertion information, the presence detection application 18 should not expect inputs to the user interface 44 at the top of the hour, at the bottom of the hour, or at other times of typical ad insertion. The presence detection application 18, instead, maintains the bandwidth allocated to the stream 12 of data, knowing that the user is in the middle of a commercial-free movie.

The presence detection application 18 thus helps conserve bandwidth. When the presence detection application 18 infers that the user is present, the allocated bandwidth for the stream 12 of data may be justified and maintained. The presence detection application 18 makes no change in the data rate of the stream 12 of data. That is, the stream 12 of data is continually delivered at its full resolution, whatever that full resolution may be. When, however, the presence detection application 18 infers that the user is not present, actions are taken to conserve bandwidth. If the presence detection application 18 cannot detect or infer the presence of the user, then there may be no need to communicate a high-bandwidth stream 12 of data from the communications network 14. As the following paragraphs will explain, when the presence of the user cannot be predicted or detected, the presence detection application 18 causes degradation in the stream 12 of data. The stream 12 of data may be degraded to a reduced-resolution version to conserve bandwidth. The stream 12 of data may even be terminated.

Figure 7:
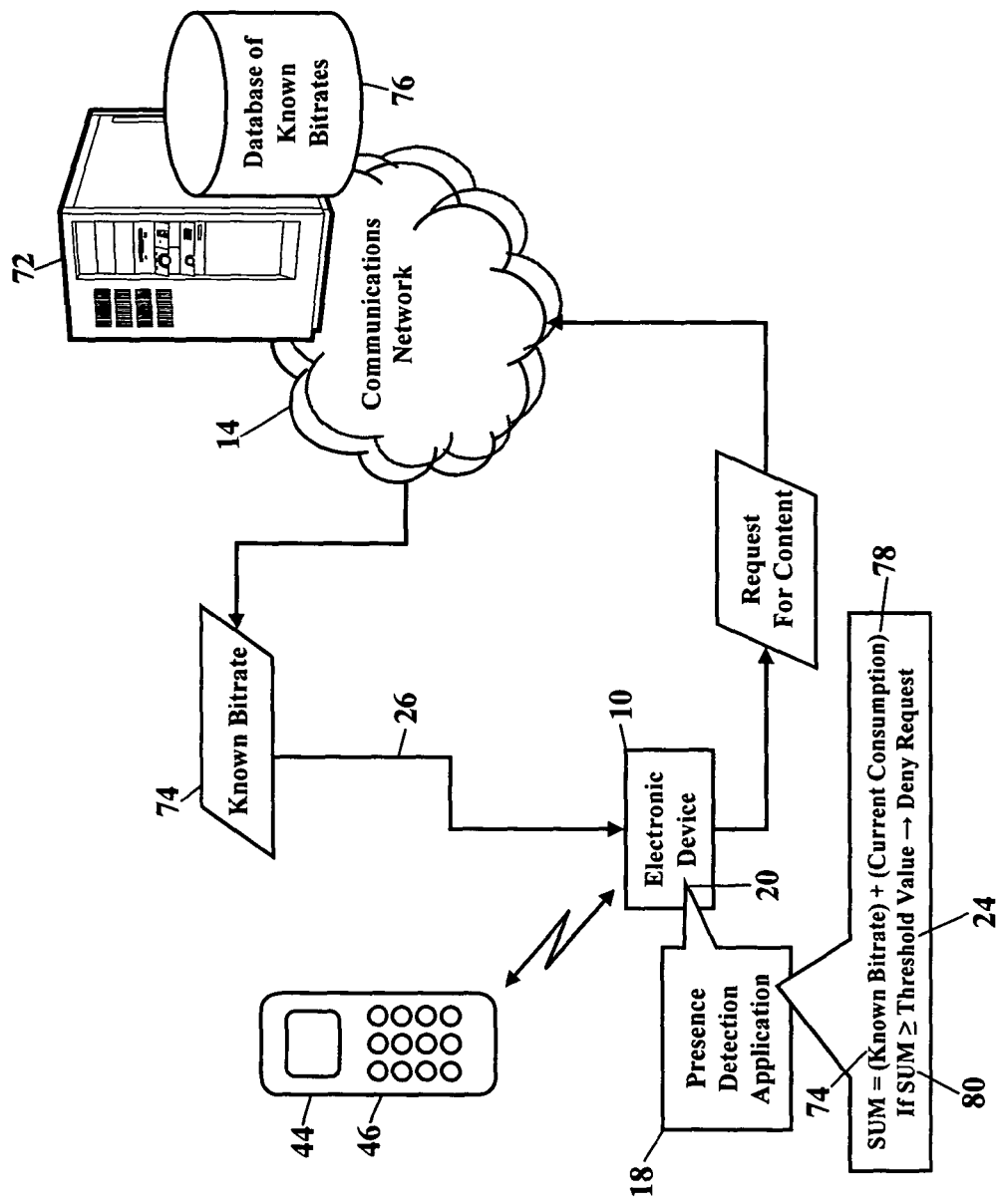
FIG. 7 is a schematic illustrating a summation of bitrates, according to still more exemplary embodiments.

FIG. 7 is a schematic illustrating a summation of bitrates, according to still more exemplary embodiments. Here, when the user makes a request for content, the presence detection application 18 determines whether that request satisfies the threshold value 24. Suppose the user requests an HDTV formatted movie. That is, the user makes one or more inputs via the user interface 44 (e.g. the remote control 46) to select the movie. The presence detection application 18 receives the user's request for content. The presence detection application

18 then sends a request 70 for content to a content server 72 via the communications network 14. When the content server 72 receives the request 70 for content, the content server 72 retrieves a known bitrate 74 for the requested content. The content server 72 queries a database 76 of known bitrates. The database 76 of known bitrates stores one or more bitrates for adequately delivering content. The database 76 of known bitrates maps media content to one or more known bitrate values. An HDTV-formatted movie, for example, may require a minimum bitrate to ensure an HDTV experience. The database 76 of known bitrates would then map that movie to its HDTV-formatted bitrate. The database 76 of known bitrates may also map that same movie to its standard definition format bitrate. The database 76 of known bitrates may also map music, games, and any other content to their respective known bitrates. The database 76 of known bitrates may also additionally or alternatively map a maximum bitrate and/or an average bitrate for any content. Whatever the database 76 of known bitrates stores, the content server 72 retrieves the known bitrate 74 for delivering that content to the user.

The presence detection application 18 retrieves that known bitrate 74. The content server 72 return communicates the known bitrate 74 to the presence detection application 18 via the communications network 14. The presence detection application 18 then sums the known bitrate 74 with the user's current bandwidth consumption 78. The presence detection application 18 then compares the sum 80 to the threshold value 24. When the sum 80 equals or exceeds the threshold value 24, then the user's requested content cannot be delivered. That is, the known bitrate 74 of the requested content is added to the user's current bandwidth consumption. If the total bandwidth exceeds threshold value 24, then the presence detection application 18 prompts the user to reduce bandwidth consumption. The presence detection application 18 may prompt the user to select alternative content having a lesser bitrate (e.g., standard definition format, reduced resolution, black and white version, music, or locally-stored content). The presence detection application 18 may additionally or alternatively prompt the user to terminate an existing session to "free up" bandwidth.

Figure 8:
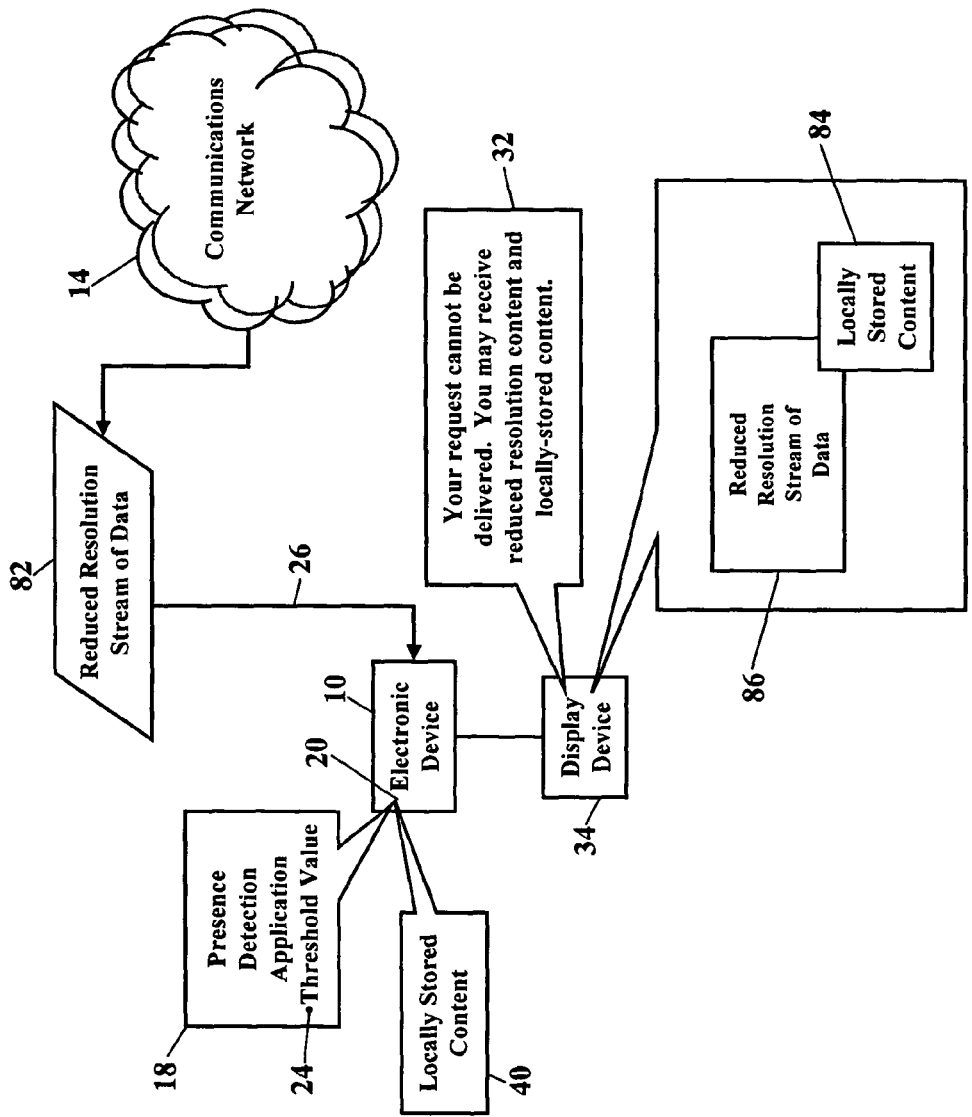
FIG. 8 is a schematic illustrating a scheme for incentivizing behavior, according to even more exemplary embodiments.

FIG. 8 is a schematic illustrating a scheme for incentivizing behavior, according to even more exemplary embodiments. When the user's bandwidth consumption exceeds the threshold value 24, the presence detection application 18 again presents the prompt 32. Here, however, the prompt 32 urges the user to accept both the locally-stored content 40 and a reduced resolution stream 82 of data. That is, because the user's bandwidth allotment is exceeded, the presence detection application 18 only permits the user to receive the reduced resolution stream 82 of data from the communications network 14. The presence detection application 18, however, also permits simultaneous retrieval of content from the local memory 20. The electronic device 10, then, may simultaneously process the locally stored content 40 and the reduced resolution stream 82 of data. The locally stored content 40 and the reduced resolution stream 82 of data may be separate and unrelated content selections, such that a "picture in a picture" (PIP) format is presented. A first window 84 presents the locally stored content 40 and a second window 86 presents the reduced resolution stream 82 of data. The locally stored content 40 and the reduced resolution stream 82 of data, however, may be related content selections, such that the content selections augment each other.

FIG. 8 permits receipt of network messages. Although the user is processing the locally stored content 40, the presence detection application 18 can still visually or audibly present content received from the communications network 14. Suppose the user is watching a movie stored in the local memory 20 or retrieved from a DVD player. Because the movie is retrieved from local memory 20, the communications link 26 to the communications network 14 may still deliver other content. The presence detection application 18, for example, may still receive and process network messages. An emergency broadcast message, for example, could still be received and displayed, despite the user watching the locally stored content 40. The second window 86 displays the reduced resolution stream 82 of data (e.g., an emergency broadcast message), so the is warned of weather and national security threats, despite watching local content.

Figure 9:
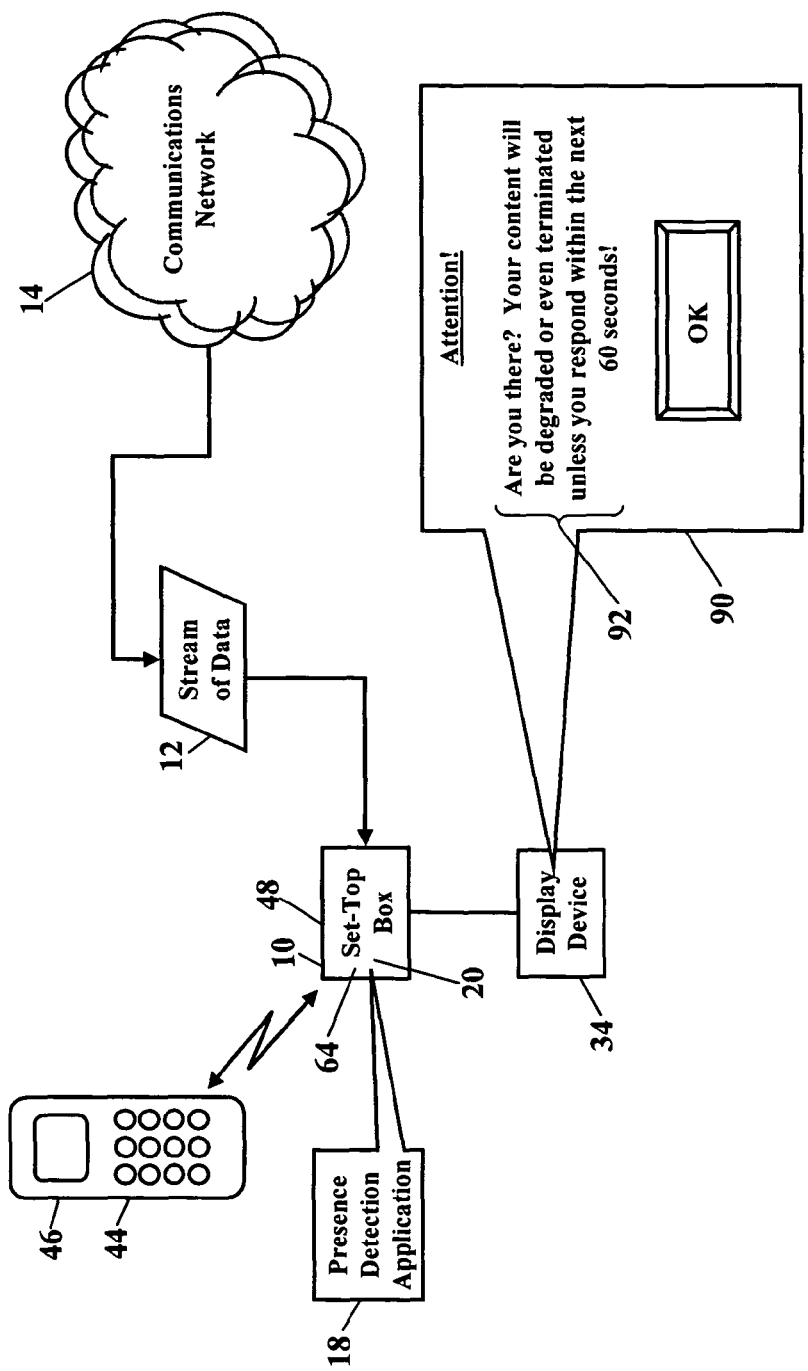
FIG. 9 is a schematic illustrating a bandwidth prompt, according to even more exemplary embodiments.

FIG. 9 is a schematic illustrating a bandwidth prompt 90, according to even more exemplary embodiments. When the presence detection application 18 infers that the user is not present, here the presence detection application 18 may visually and/or audibly cause the display device 34 (such as a television or monitor) to produce the bandwidth prompt 90. The bandwidth prompt 90, for example, may visually and/or audibly present a message 92, notifying the user that the high-resolution version of the stream 12 of data is about to be degraded, or even terminated, unless the user responds. The presence detection application 18 may recognize any input via the user interface 44 as an affirmative response, thus confirming full-resolution is desired. That is, if the user makes any input (such as pushing a button on the remote control 46), then the presence detection application 18 knows that the user is truly present and the high-resolution version of the stream 12 of data should be maintained. When the bandwidth prompt 90 is presented, the presence detection application 18 may even recognize any movement of the remote control 46 as an affirmative response. That is, perhaps the remote control 46 comprises an accelerometer or other movement or position sensor that detects movements, and such movement affirmatively indicates the user is present. The user interface 44 may additionally or alternatively comprise any means for sensing movement, such as a gravity switch, a mercury switch, a GPS transmitter or receiver, an infrared transmitter or receiver, any transmitter or receiver utilizing any portion of the electromagnetic spectrum, or any device utilizing the Doppler effect. The bandwidth prompt 90 may include a visual and/or audible timer that counts down the remaining time until degradation. If no response to the bandwidth prompt 90 is detected, then the presence detection application 18 implements actions to reduce bandwidth.

Figure 10:
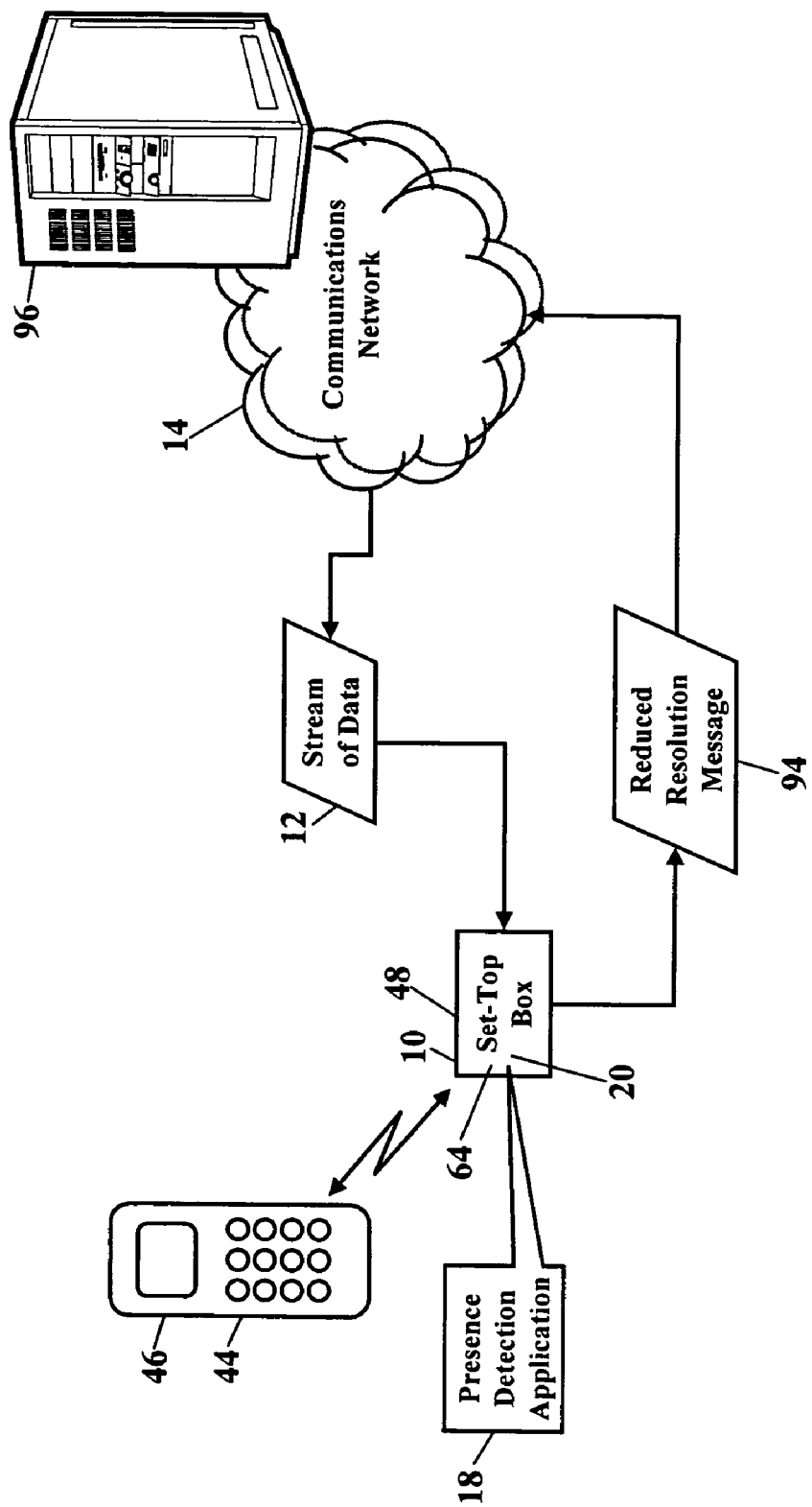
FIG. 10 illustrates a reduced resolution message, according to yet more exemplary embodiments.

FIG. 10 illustrates a reduced resolution message 94, according to yet more exemplary embodiments. When the presence detection application 18 infers that the user is not present, then bandwidth is possibly being wasted. The presence detection application 18 may immediately take actions to reduce bandwidth consumption. The presence detection application 18 may additionally produce the bandwidth prompt (shown as reference numeral 90 in FIG. 9) to confirm the presence of the user. Regardless, when the presence detection application 18 is ready to conserve network resources, the presence detection application 18 sends the reduced resolution message 94 to a server 96. The stream 12 of data is sent by the server 96, and the reduced resolution message 94 instructs the server 96 to reduce the resolution of the stream 12 of data. The server 96 receives the reduced resolution message 94 via the communications network 14.

Figure 11:
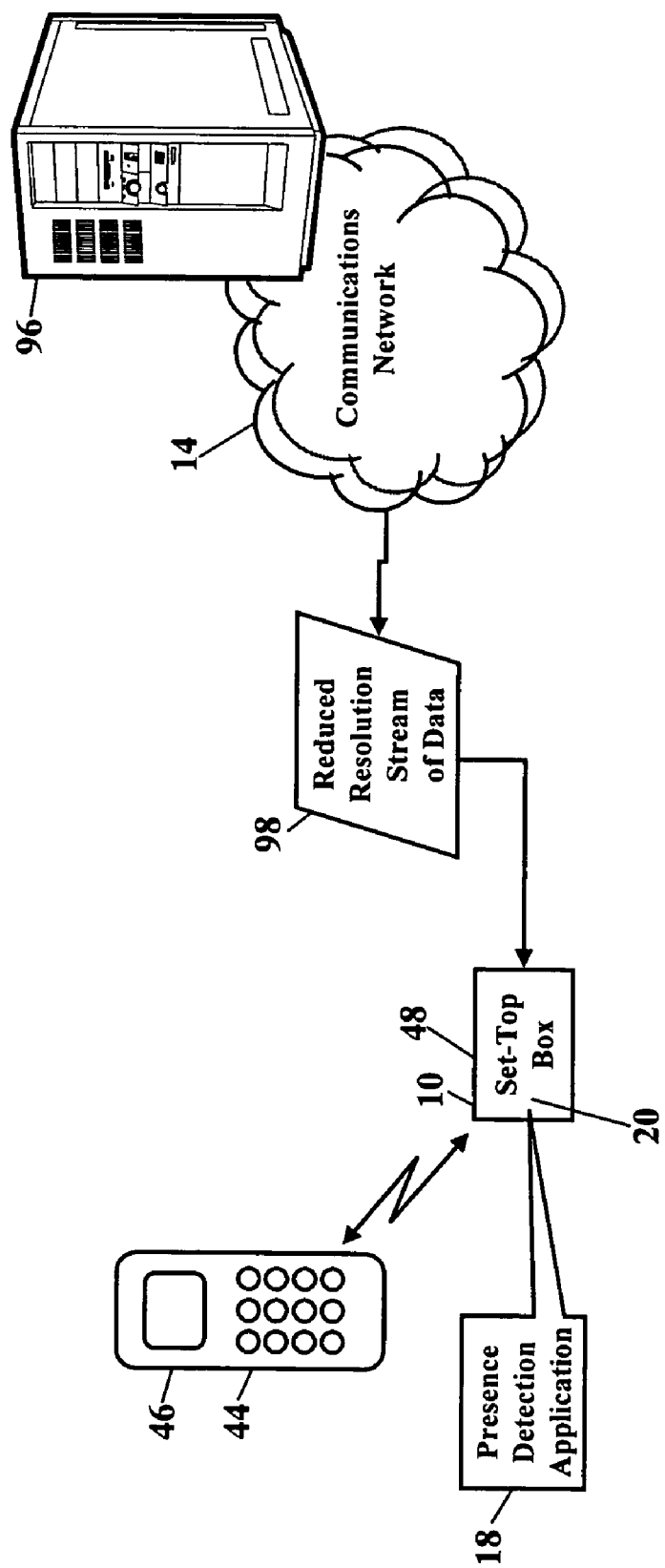
FIG. 11 is a schematic illustrating transmission of a reduced resolution stream of data, according to exemplary embodiments.

FIG. 11 is a schematic illustrating transmission of a reduced resolution stream 98 of data, according to exemplary embodiments. When the server 96 receives the reduced resolution message 98, the server 96 implements strategies to conserve network resources. The reduced resolution message 98 instructs the server 96 to reduce the resolution of the stream 12 of data. As FIG. 11 illustrates, the reduced resolution stream 98 of data is then processed and sent from the server 96 to the set top box 48 via the communications network 14. The reduced resolution stream 98 of data has a reduced data rate measured in bytes per second. Because the reduced resolution stream 98 of data has a reduced data rate, the bandwidth allocated to the set top box 48 may be reduced and reallocated to other uses within the communications network 14. The reduced resolution stream 98 of data may have reduced resolution audio and/or video portions to conserve bandwidth.

Figure 12:
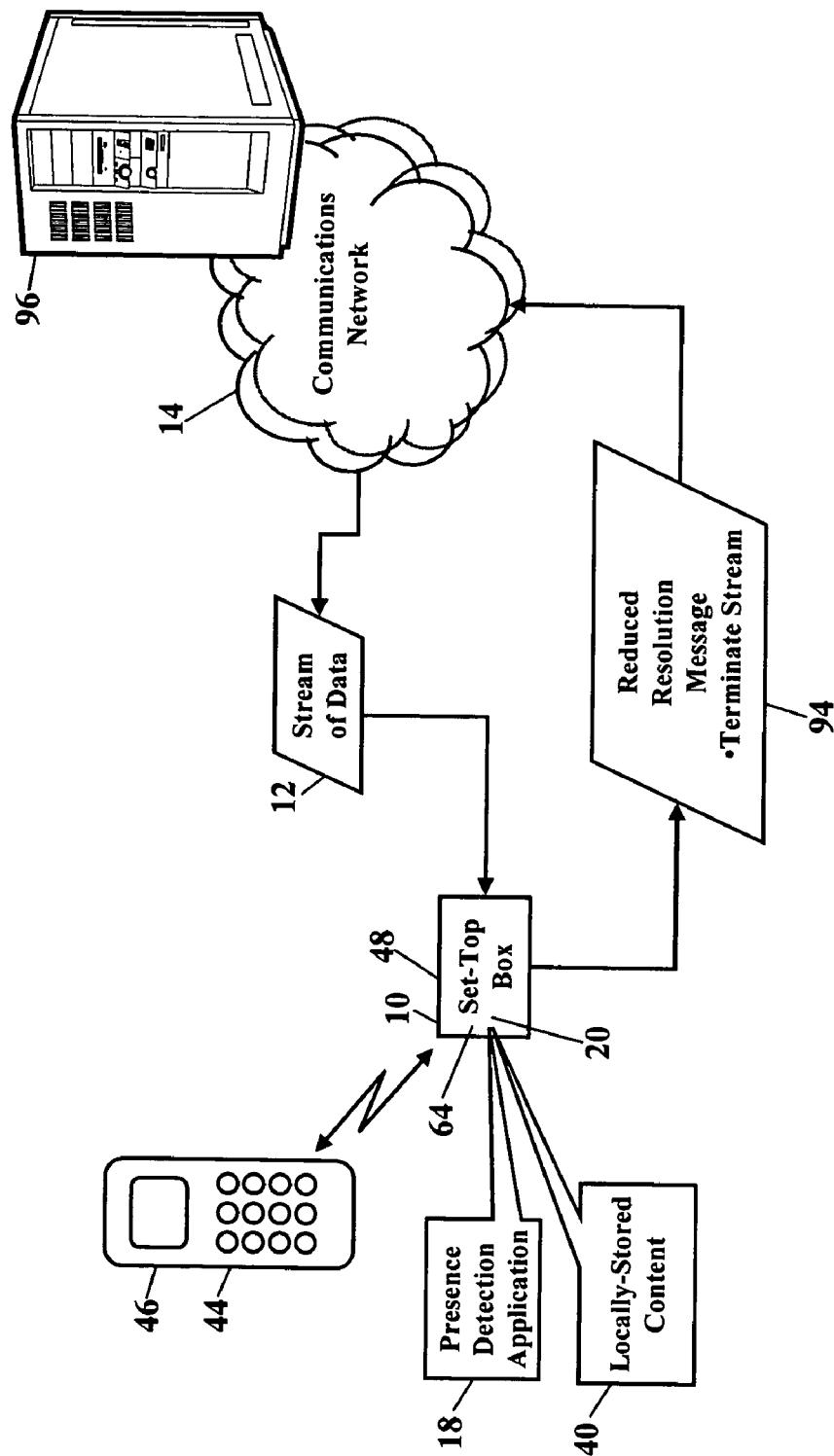
FIG. 12 is a schematic illustrating local retrieval of content, according to more exemplary embodiments.

FIG. 12 is another schematic illustrating local retrieval of content, according to more exemplary embodiments. Here, when the presence detection application 18 sends the reduced resolution message 98 to the server 96, the reduced resolution message 98 instructs the server 96 to terminate the stream 12 of data. That is, the presence detection application 18 instructs the server 96 to cease delivery of the full-resolution stream 12 of data. The presence detection application 18, instead, locally retrieves content from the memory 20 and causes that local content 40 to be visually and/or audibly presented to the user. When the presence detection application 18 infers that the user is not present, the presence detection application 18 ceases transmission of the stream 12 of data for maximum reduction in bandwidth. The presence detection application 18 then reverts to the locally-stored content 40 retrieved from the local memory 20. The locally-stored content 40 may be a movie, music, slide show, family photos, or any other file (having any format or extension). The locally-stored content 40 still presents audio and/or video content, yet the locally-stored content 40 is not drawing or requiring bandwidth from the communications network 14. The locally-stored content 40 may be selected and downloaded by a content provider, a service provider, or by a network operator. The locally-stored content 40 may also be selected and configurable by the user.

The locally-stored content 40 may be advantageously selected. The presence detection application 18, for example, may retrieve a promotion that is locally stored in the memory 20. The promotion encourages the user to select or to tune to content, a product, or a service that might be of interest to the user. That content, product, or service could also generate revenue for the network operator and/or the content provider. Perhaps, for example, the presence detection application 18 detects or infers that the user is not present. The presence detection application 18 may then terminate the stream 12 of data and, instead, retrieve a promotion channel from local memory. The promotion channel may promote video-on-demand services, special event programming, or other pay-per-view programming that may appeal to the user. If the user is present and intrigued, the user may make a purchase.

The presence detection application 18 may implement other actions. When the presence detection application 18 infers that the user is not present, then bandwidth is possibly being wasted. The presence detection application 18 may immediately take actions to reduce bandwidth consumption. The presence detection application 18 may assume the user has left the room or fallen asleep, and so the presence detection application 18 disables or "turns off" the screen and speakers. Whenever the presence detection application infers with a high probability that the user is not present, the presence detection application 18 may lower the volume. If the user is present, the user should be motivated to restore the volume or provoked to make some other input. The presence detection application 18 may be configured for other scenarios that reduce bandwidth consumption.

Figure 13:
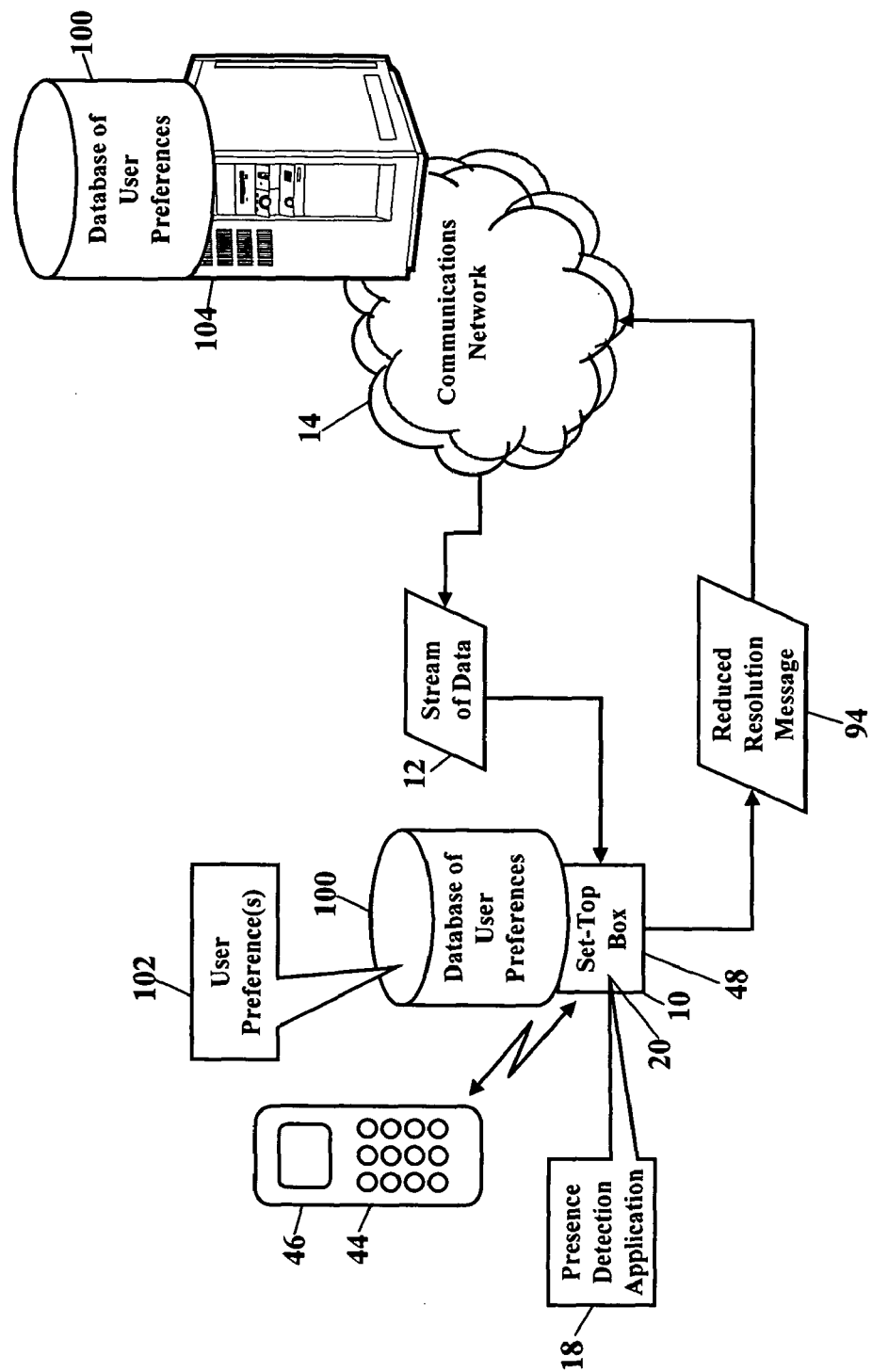
FIG. 13 is a schematic illustrating the use of user preferences when conserving bandwidth, according to yet more exemplary embodiments.

FIG. 13 is a schematic illustrating the use of user preferences when conserving bandwidth, according to more exemplary embodiments. Here, when the presence detection application 18 takes actions to conserve bandwidth, the presence detection application 18 consults a database 100 of user preferences. The database 100 of user preferences stores one or more preferences 102 associated with the user. The database 100 of user preferences may be locally stored in the memory 20 of the electronic device 10. The database 100 of user preferences may be additionally or alternatively be stored at a remote location, such as a remote server 104 communicating with the electronic device 10 via the communications network 14. These preferences 102 describe how the user wishes the stream 12 of data to be degraded when conserving bandwidth. The user, for example, may have a preference for an audio-only version of the stream 12 of data, such that video portions are discarded or otherwise not transmitted. The user may alternatively prefer a grainy video portion and/or a smaller sized resolution version of the stream 12 of data. The user may prefer that the stream 12 of data be terminated. How the user specifies their preferences may depend on economic factors. If, for example, the user pays a per-minute charge for broadband usage, the user may prefer that the stream 12 of data be terminated when presence is not detected. If the user pays according to data rate, then the user may prefer that the stream 12 of data be degraded, or again even terminated, when conserving bandwidth. The network operator, service provider, or content provider may even provide incentives to conserve bandwidth. These incentives, for example, may cause the user to agree to termination or to degradation during peak demand times, designated events, network outages, or any other circumstances.

Figure 14:
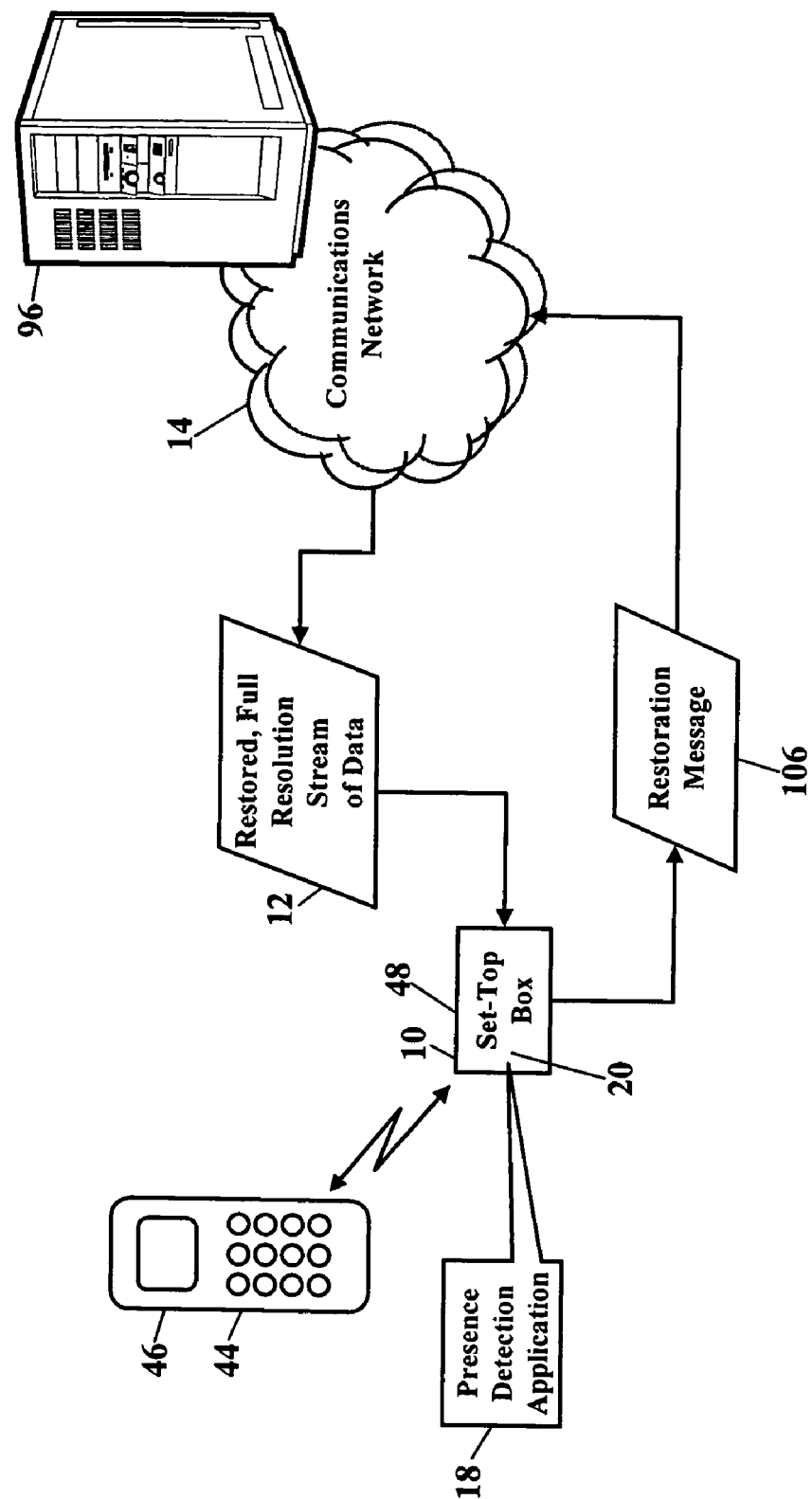
FIG. 14 is a schematic illustrating the restored, full-resolution stream of data, according to exemplary embodiments.

FIG. 14 is a schematic illustrating the restored, full-resolution stream 12 of data, according to exemplary embodiments. The presence detection application 18 may continually monitor for the presence of the user. When the presence of the user is redetected, or inferred, then the presence detection application 18 causes a restoration in the data rate (e.g., bytes per second) of stream 12 of data. The presence detection application 18 sends a restoration message 106 to the server 96, and the restoration message 106 instructs the server 96 to restore the full-resolution data rate of the stream 12 of data. When the server 96 receives the restoration message 106, the server 96 resumes sending the full-resolution version of the stream 12 of data.

The presence detection application 18 may also send the restoration message 106 with any input via the user interface 44. As the above paragraphs explained, the presence detection application 18 may recognize any input via the user interface 44 as an affirmative indication of the presence of the user. As the electronic device 10 receives the reduced resolution stream of data (shown as reference numeral 98 in FIG. 11), the presence detection application 18 continually monitors for the presence of the user. Should the presence detection application 18 infer the presence of the user, then the presence detection application 18 restores the full-resolution version of the stream 12 of data. When, for example, the user makes any input via the user interface 44 (such as pushing a button on the remote control 46) after bandwidth is conserved, then the presence detection application 18 knows that the user is present and the high-resolution version of the stream 12 of data should be restored. The user, as earlier explained, may simply move the remote control 46 to indicate his or her presence. Such movement causes the presence detection application 18 to send the restoration message 106, thus instructing the server 96 to resume sending the full-resolution version of the stream 12 of data.

Figure 15:
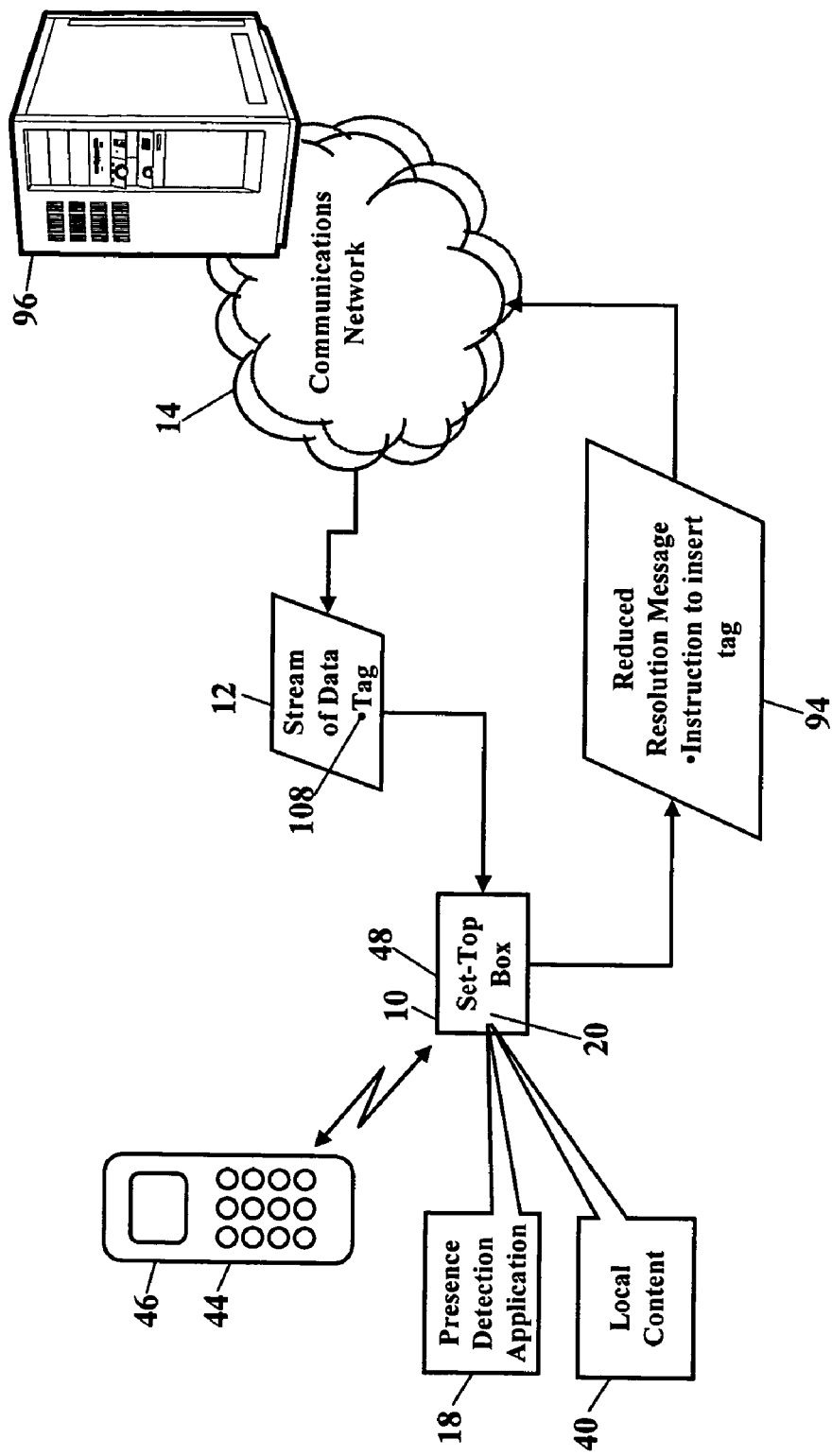
FIG. 15 is a schematic illustrating the use of tags, according to still more exemplary embodiments.

FIG. 15 is a schematic illustrating the use of tags, according to still more exemplary embodiments. Recall that when the presence detection application 18 infers that the user is not present, the presence detection application 18 sends the reduced resolution message 94 to the server 96. The reduced resolution message 94 instructs the server 96 to reduce the resolution of the stream 12 of data. The server 96 then processes and sends the reduced resolution stream of data (shown as reference numeral 98 in FIG. 11). The reduced resolution stream of data has a reduced data rate measured in bytes per second. Here, however, the presence detection application 18 also instructs the server 96 to mark or tag the full-resolution version of the stream 12 of data. The full-resolution version of the stream 12 of data is tagged at the point it was interrupted. A tag 108 is inserted into the full-resolution version of the stream 12 of data at the point in time at which degradation occurs. If the presence detection application 18 has erred—that is, the presence detection application 18 has incorrectly inferred that the user is not present—then the presence detection application 18 can return the user to the point in the stream 12 of data prior to degradation. Should the user affirmatively respond to the bandwidth prompt (shown as reference numeral 90 in FIG. 9), make an input via the user interface 44, move the remote control 46, or any other action that indicates the user is present, then the full-resolution version of the stream 12 of data is resumed from the moment or time denoted by the tag 108. The user need only pick up or move the remote control 46 and the presence detection application 18 restores to the previous state.

Figure 16:
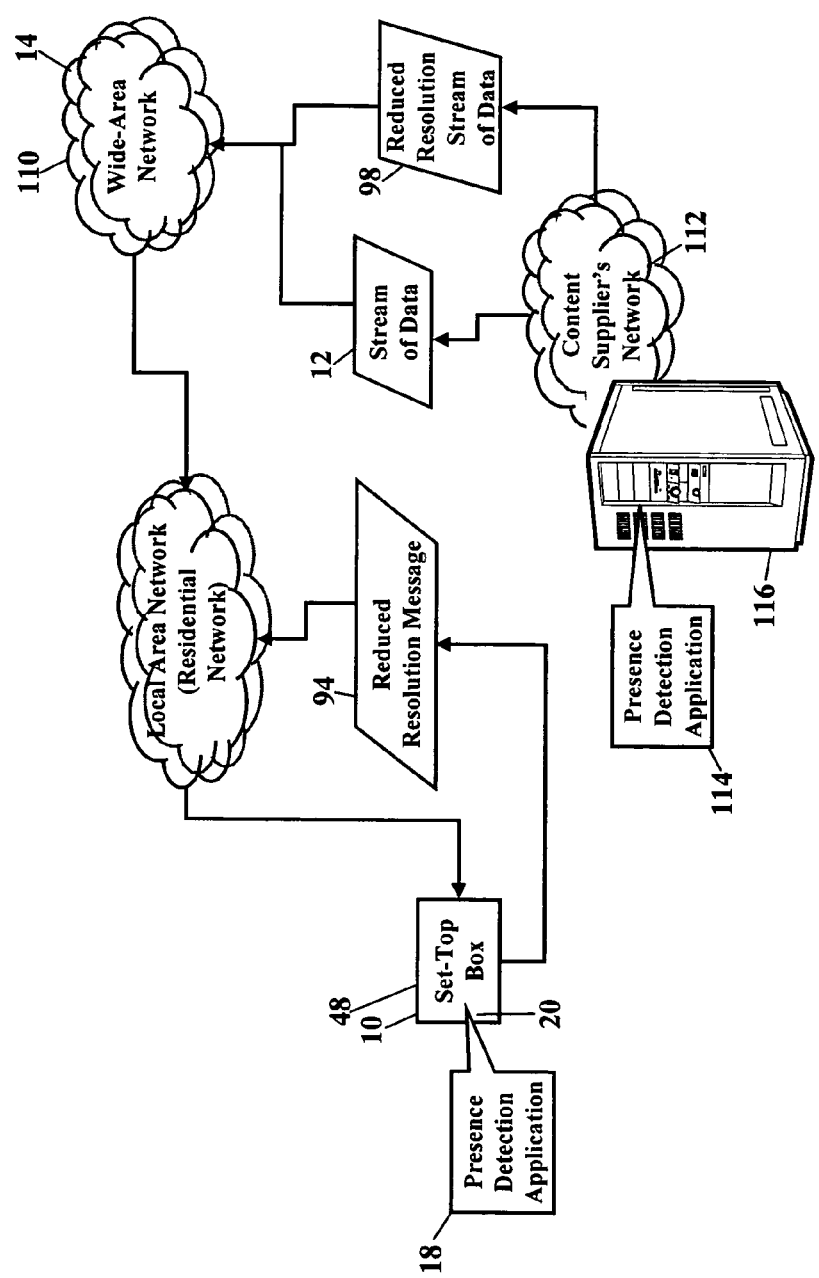
FIG. 16 is a schematic illustrating an alternative operating environment, according to more exemplary embodiments.

FIG. 16 is a schematic illustrating an alternative operating environment for the presence detection application 18, according to more exemplary embodiments. Here the presence detection application 18 reduces bandwidth in a wide area network (WAN) 110 (such as the communications network 14) and may also reduce bandwidth in a content supplier's network 112. The presence detection application 18 entirely or partially stores within the memory 20 of the electronic device 10. A complimentary presence detection application 114 also operates within the content supplier's network 112 (such as within a content server 116). When the electronic device 10 detects or infers that the user is not present, the presence detection application 18 enters the low bandwidth state. The reduced resolution message 56 is sent from the electronic device 10 to the content supplier's network 82. The reduced resolution message 94 routes through the wide area network 110 and informs the content supplier's network 112 of the low-bandwidth state.

Here the content supplier's network 112 reduces bandwidth. A device operating in the content supplier's network 112 (such as the content server 116) receives the reduced resolution message 94 and reduces the bit rate of the stream 12 of data. That is, the content supplier's network 112 may discard bits to reduce resolution. The content supplier's network 112, therefore, begins transmitting the reduced resolution stream 98 of data having a reduced resolution. The reduced resolution stream 98 of data routes through the wide area network 110 to the electronic device 10. This solution, then, reduces bandwidth in the wide area network 110 and may also reduce bandwidth in the content supplier's network 112.

Figure 17:
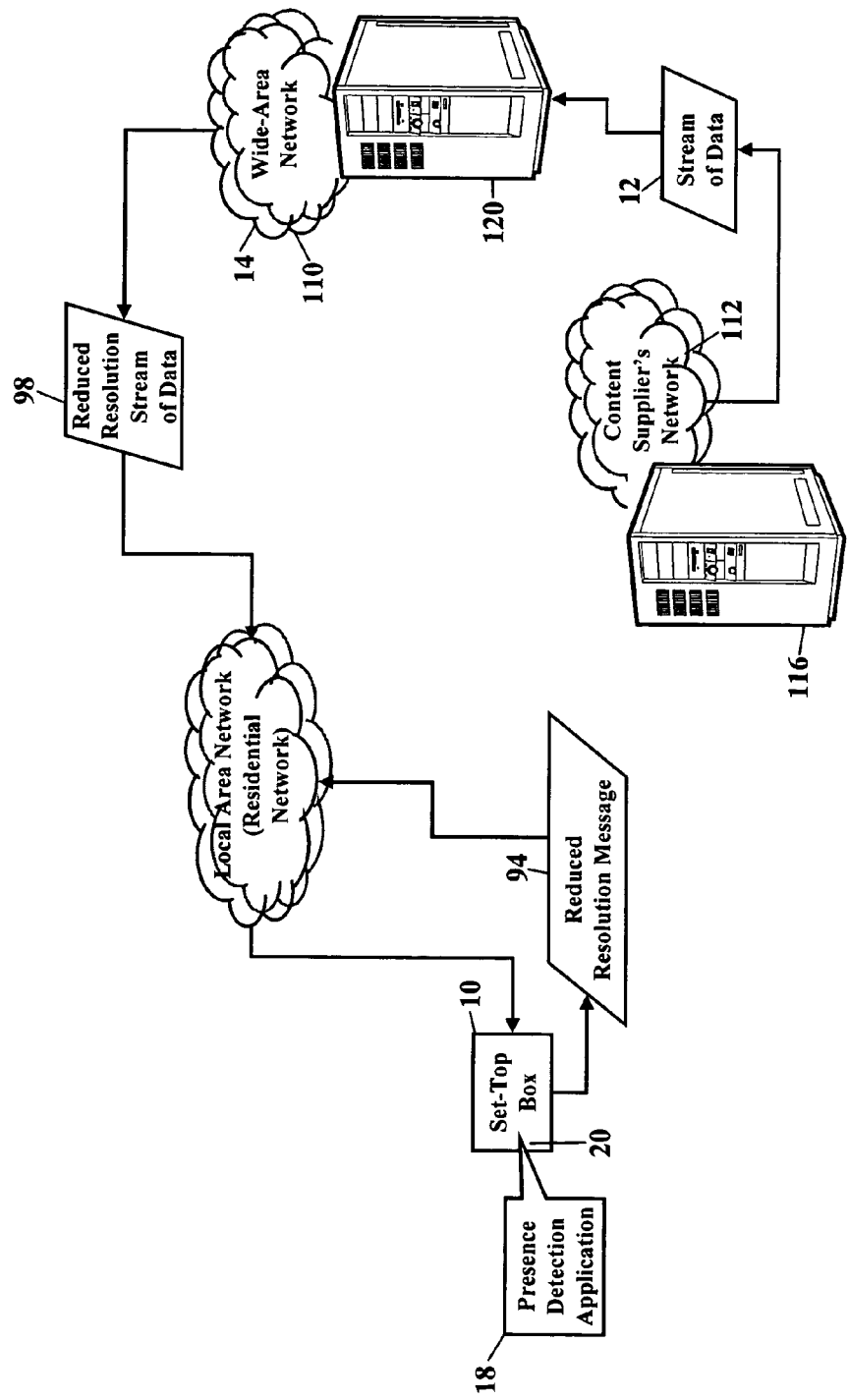
FIGS. 17-18 are schematics illustrating solutions for a broadband remote access server (BRAS), according to even more exemplary embodiments.

FIG. 17 is a schematic illustrating a solution for a broadband remote access server (BRAS) 120, according to even more exemplary embodiments. The broadband remote access server 120 sets policies for individual users and each user's allowance of bandwidth consumption. The broadband remote access server 120 also sets policies for individual sessions, regardless of the user. Here, when the presence detection application 18 infers that low-bandwidth is desired, a transaction is established with the broadband remote access server 120. When the electronic device 10 (such as the set top box 48) detects or infers that the user is not present, the presence detection application 18 enters the low bandwidth state. The reduced resolution message 94 is sent from the set top box 48 to the broadband remote access server 120. The reduced resolution message 94 routes through the wide area network 110 and informs the broadband remote access server 120 of the low-bandwidth state.

The broadband remote access server 120 may itself reduce bandwidth. When the broadband remote access server 120 receives the reduced resolution message 94, the broadband remote access server 120 itself reduces the bit rate of the stream 12 of data. That is, the broadband remote access server 120 receives the full resolution stream 12 of data and discards bits to reduce resolution. The broadband remote access server 120, therefore, begins transmitting the reduced resolution stream 98 of data having a reduced resolution. The reduced resolution stream 98 of data routes through the wide area network 110 to the electronic device 10. This solution reduces bandwidth in the wide area network 110, yet this solution fails to reduce bandwidth in the content supplier's network 112.

Figure 18:
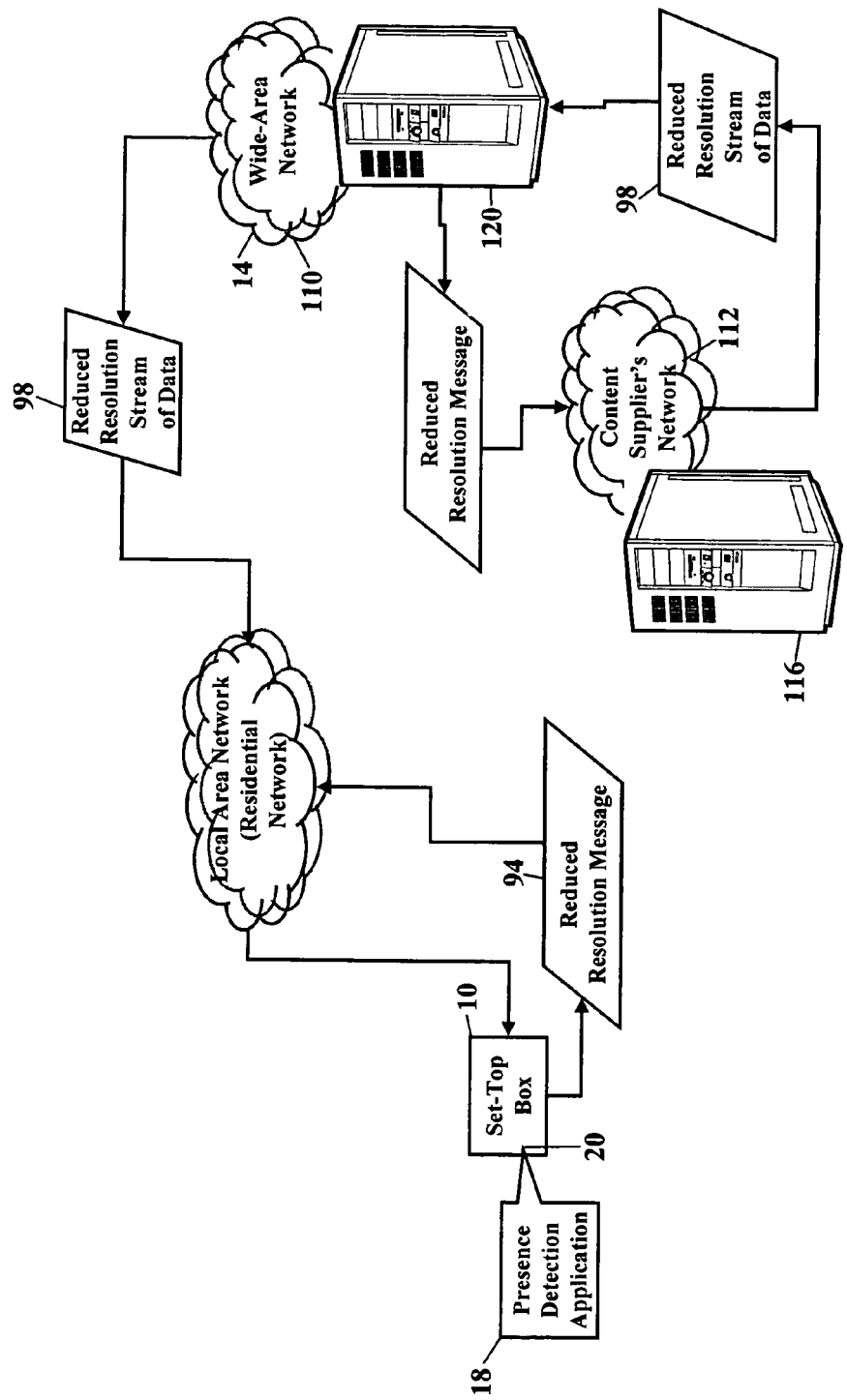

FIG. 18 is a schematic further illustrating the broadband remote access server (BRAS) 120, according to still more exemplary embodiments. FIG. 18 is similar to FIG. 17, although here the content supplier's network 112 is instructed to reduce the resolution of the stream 12 of data. When the electronic device 10 (such as the set top box 48) detects or infers that the user is not present, the presence detection application 18 enters the low bandwidth state. The reduced resolution message 94, as before, routes from the electronic device 10, through the wide area network 110, and to the broadband remote access server 120. The reduced resolution message 94 informs the broadband remote access server 120 of the low-bandwidth state.

The broadband remote access server 120 then instructs the content supplier to reduce the bit rate of the session. The broadband remote access server 120 sends a message to the content supplier's network 112. The message is received by some controller (such as the content server 116). The content server 116 then discards bits from the stream of data (shown as reference numeral 12 in FIG. 17). The message from the broadband remote access server 120 may simply be a forwarded version of the reduced resolution message 94, as FIG. 18 illustrates. The message from the broadband remote access server 120, however, may take any form and have any protocol. Whatever the form, the message instructs or informs the content server 116 of the low-bandwidth need. The reduced resolution stream 98 of data, having a reduced resolution, routes through the wide area network 110 to the electronic device 10. This solution, then, reduces bandwidth in both the wide area network 110 and in the content supplier's network 112.

Figure 19:
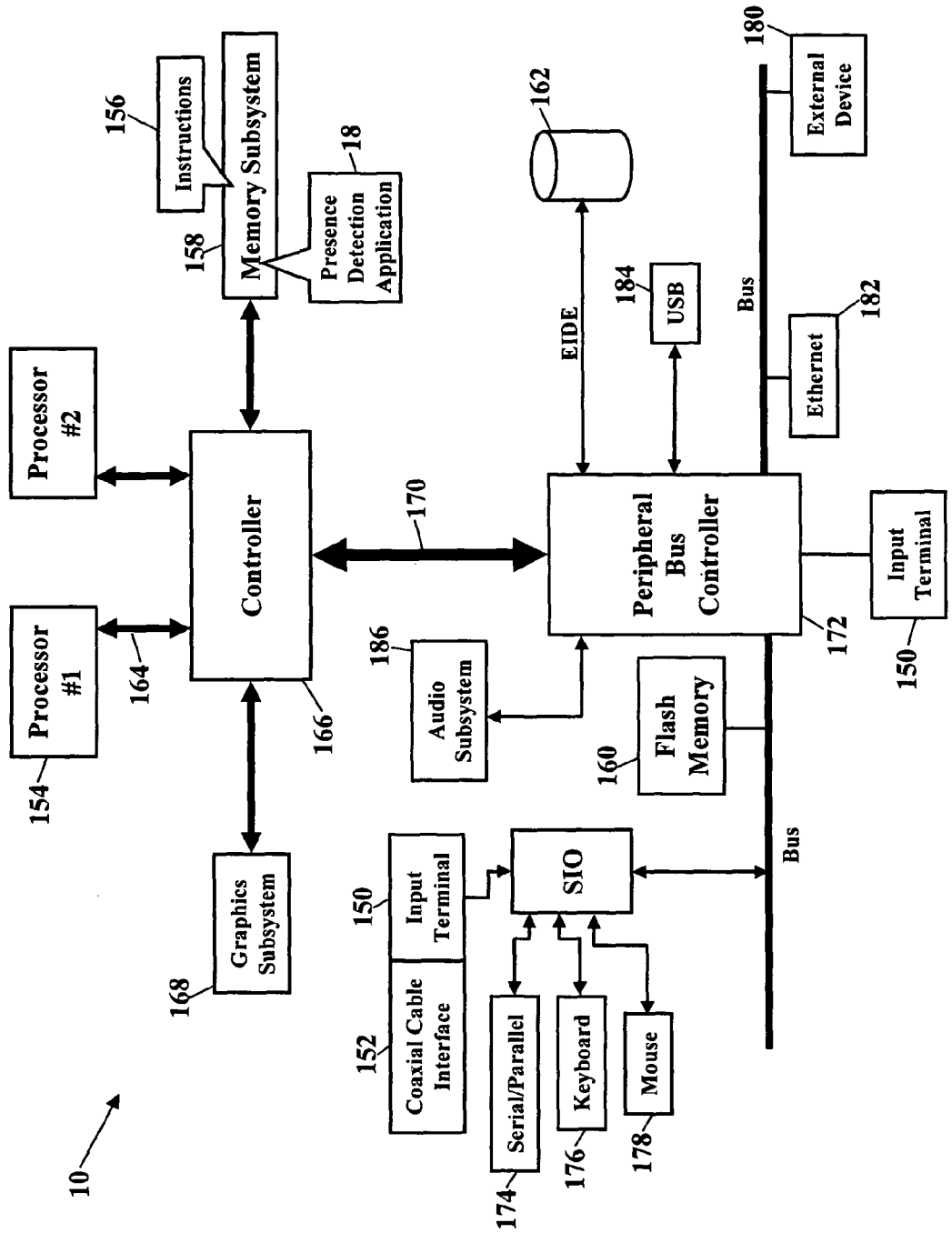
FIG. 19 is a block diagram of exemplary details of an electrical device shown in FIGS. 1-18.

FIG. 19 is a block diagram of exemplary details of the electrical device 10 shown in FIGS. 1-18. The electrical device 10 can be any device, such as an analog/digital recorder, television, CD/DVD player/recorder, audio equipment, receiver, tuner, and/or any other consumer electronic device. The electrical device 10 may also include any computer, peripheral device, camera, modem, storage device, telephone, personal digital assistant, and/or mobile phone. The electrical device 10 may also be configured as the set-top box ("STB") receiver that receives and decodes digital signals (the set top box is shown as reference numeral 48 in FIGS. 6 & 9-18). The electrical device 10, in fact, can be any electronic/electrical device that has an input 150 for receiving the stream of data (shown as reference numeral 12 in FIGS. 1-11). The input 150 may include a coaxial cable interface 152 for receiving signals via a coaxial cable (not shown). The input 150 may additionally or alternatively include an interface to a fiber optic line, to a telephone line (such as an RJ-48/56), to other wiring, and to any male/female coupling. The input 150 may even include a wireless transceiver unit for wirelessly receiving transmitted signals. The electrical device 10 includes one or more processors 154 executing instructions 156 stored in a system memory device. The instructions 156, for example, are shown residing in a memory subsystem 158. The instructions 156, however, could also reside in flash memory 160 or a peripheral storage device 162. When the processor 154 executes the instructions 156, the processor 154 may also consult the presence detection application 18 stored in the system memory device. The one or more processors 154 may also execute an operating system that controls the internal functions of the electrical device 10. A bus 164 may communicate signals, such as data signals, control signals, and address signals, between the processor 154 and a controller 166. The controller 166 provides a bridging function between the one or more processors 154, any graphics subsystem 168 (if desired), the memory subsystem 158, and, if needed, a peripheral bus 170. The peripheral bus 170 may be controlled by the controller 166, or the peripheral bus 170 may have a separate peripheral bus controller 172. The peripheral bus controller 172 serves as an input/output hub for various ports. These ports include the input terminal 150 and perhaps at least one output terminal. The ports may also include a serial and/or parallel port 174, a keyboard port 176, and a mouse port 178. The ports may also include one or more external device ports 180, networking ports 182 (such as Ethernet), and a USB port 184. The electrical device 10 may also include an audio subsystem 186. The electrical device 10 may also include the display device (such as LED, LCD, plasma, or any other) to present instructions, messages, tutorials, and other information to a user. The electrical device 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 154 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then understand that the exemplary embodiments are not limited to any particular manufacturer's component, or architecture, or manufacture.

The memory (shown as memory subsystem 158, flash memory 160, or peripheral storage device 162) may also contain an application program. The application program cooperates with the operating system and with a video display device to provide a Graphical User Interface (GUI). The graphical user interface provides a convenient visual and/or audible interface with a user of the electrical device 10.

Figure 20:
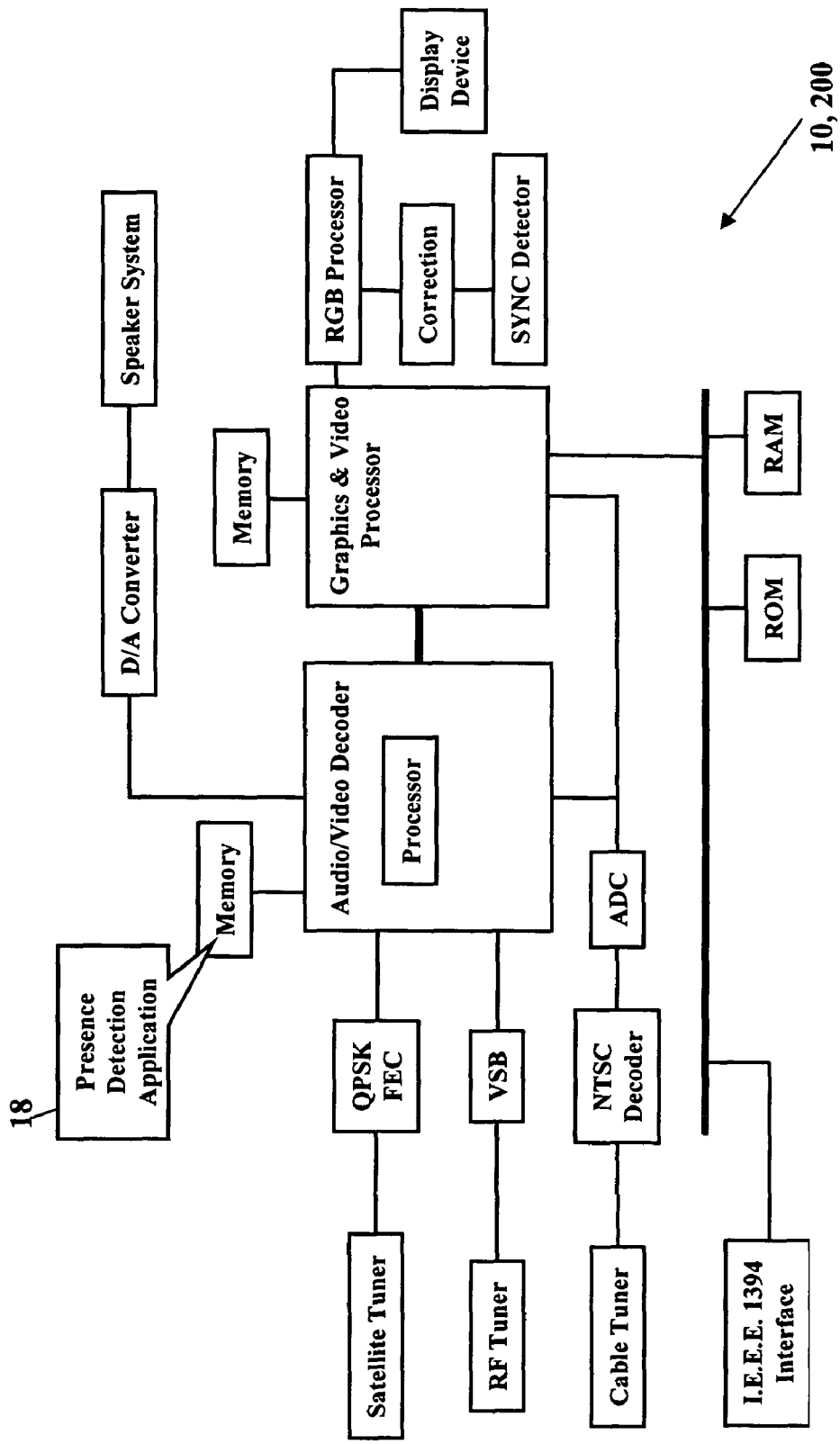
FIG. 20 is a block diagram of exemplary details of another electrical device.

FIG. 20 is a block diagram further illustrating the electrical device 10, according to yet more of the exemplary embodiments. Here the electrical device 10 is shown as a digital high definition television (HDTV) system 200. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The presence detection application 18 may be stored in any memory location or device in the television 200. FIG. 20, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004), with each incorporated herein by reference.

FIG. 21 is a flowchart illustrating a method of conserving bandwidth, according to exemplary embodiments. A request for content is received (Block 300). A known bitrate for delivering that content is retrieved (Block 302). The known bitrate is summed with the user's current bandwidth consumption (Block 304). The sum is compared to a threshold value (Block 306). If the sum equals or exceeds the threshold value (Block 308), then the user is prompted to reduce bandwidth consumption (Block 310). A prompt may be processed that urges the user to forego a high definition stream of data and to instead receive a standard definition stream of data (Block 312). The user may be prompted to retrieve locally stored content (Block 314) and/or the user's access to content is restricted (Block 316). The user's behavior may also be incentivized to reduce bandwidth consumption (Block 318). The user may be incentivized to simultaneously retrieve and process locally stored content and a reduced resolution stream of data (Block 320), such that a first window presents the locally stored content and a second window presents the reduced resolution stream of data (Block 322).

The presence detection application 18 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the presence detection application 18 to be easily disseminated. A computer program product for conserving bandwidth comprises the computer-readable medium, and the presence detection application stores on the computer-readable medium. The presence detection application comprises computer code for detecting, inferring, and/or predicting the physical presence of a user. If the physical presence of the user is determined, then a full-resolution stream of data is delivered to an electrical device. If, however, the physical presence of the user cannot be detected, inferred, or predicted, then the resolution of the stream of data is reduced, or the stream is even terminated, to conserve bandwidth.

The presence detection application 18 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method to conserve bandwidth, comprising:
    monitoring by a presence detection application on a user device a user's bandwidth consumption of a communication network;
    wherein the presence detection application on the user device is configured to determine a presence of a user;
    receiving by the presence detection application a historical pattern describing a top of an hour user inputs, the top of the hour user inputs corresponding to channel surfing on a television;
    determining, by the presence detection application, that user inputs are to be received based on the historical pattern describing the top of the hour user inputs corresponding to channel surfing on the television;
    wherein the presence detection application is configured to decide to ignore the historical pattern describing the top of the hour user inputs corresponding to channel surfing on the television when the user is consuming a movie that does not transition to advertisements, in which deciding to ignore the historical pattern describing the top of the hour user inputs corresponding to channel surfing on the television causes the presence detection application to refrain from indicating that the user is absent and to maintain the user's bandwidth consumption.

2. A method according to claim 1, further comprising prompting the user to forego a high definition stream of data and to instead receive a standard definition stream of data, which reduces the user's bandwidth consumption.

3. A method according to claim 1, further comprising prompting the user to retrieve locally stored content, which reduces the user's bandwidth consumption;
    wherein the presence detection application is configured to determine when the user's bandwidth consumption exceeds a threshold value.

4. A method according to claim 1, further comprising when user inputs corresponding to channel surfing are expected to a user interface, but no user inputs corresponding to channel surfing are received during transition to an advertisement, predicting that no user is present and conserving bandwidth by reducing the user's bandwidth consumption.

5. A method according to claim 1, further comprising:
    receiving a request for content; retrieving a known bitrate for delivering the content to the user; summing the known bitrate with the user's current bandwidth consumption to result in a sum; comparing the sum to a threshold value; and when the sum exceeds the threshold value, prompting the user to reduce the user's bandwidth consumption.

6. A method according to claim 1, further comprising comparing by the presence detection application the user's bandwidth consumption to a threshold value; and
    when the user's bandwidth consumption exceeds the threshold value, incentivizing by the presence detection application behavior that reduces the user's bandwidth consumption;
    wherein incentivizing behavior comprises: retrieving locally stored content to reduce the user's bandwidth consumption; receiving a reduced resolution stream of data; and processing the locally stored content and the reduced resolution stream of data such that a first window presents the locally stored content and a second window presents the reduced resolution stream of data.

7. A user device, comprising:
    a processor of the user device receiving inputs via a user interface;
    a memory comprising a program, the processor coupled to the memory to execute the program;
    the processor monitoring a user's bandwidth consumption;
    the processor receiving a historical pattern describing a top of an hour user inputs, the top of the hour user inputs corresponding to channel surfing on a television;
    the processor determining that user inputs are to be received based on the historical pattern describing the top of the hour user inputs corresponding to channel surfing on the television;
    the processor deciding to ignore the historical pattern describing the top of the hour user inputs corresponding to channel surfing on the television when the user is consuming a movie that does not transition to advertisements, in which deciding to ignore the historical pattern describing the top of the hour user inputs corresponding to channel surfing on the television causes the processor to refrain from indicating that the user is absent and to maintain the user's bandwidth consumption.

8. A device according to claim 7, wherein the processor prompts the user to forego a high definition stream of data and to instead receive a standard definition stream of data, which reduces the user's bandwidth consumption.

9. A device according to claim 7, wherein the processor prompts the user to retrieve locally stored content, which reduces the user's bandwidth consumption.

10. A device according to claim 7, wherein the processor restricts the user's access to content, which reduces the user's bandwidth consumption.

11. A device according to claim 7, wherein when user inputs are expected to the user interface corresponding to channel surfing on the television, but no user inputs corresponding to channel surfing on the television are received during transition to an advertisement, the processor predicts that no user is present and conserves bandwidth, which reduces the user's bandwidth consumption.

12. A device according to claim 7, wherein the processor: receives a request for content; retrieves a known bitrate for delivering the content to the user; sums the known bitrate with the user's current bandwidth consumption to result in a sum; compares the sum to the threshold value; and when the sum exceeds the threshold value, prompts the user to reduce bandwidth consumption.

13. A device according to claim 7, wherein the processor: retrieves locally stored content to reduce the user's bandwidth consumption; processes a reduced resolution stream of data; and processes the locally stored content and the reduced resolution stream of data such that a first window presents the locally stored content and a second window presents the reduced resolution stream of data.

14. A computer program product, tangibly embodied on a non-transitory computer readable medium, the computer program product including instructions for causing a user device to execute a method for conserving bandwidth, comprising:
monitoring a user's bandwidth consumption of a communication network;
wherein a presence detection application on the user device is configured to determine a presence of a user;
receiving a historical pattern describing a top of an hour user inputs, the top of the hour user inputs corresponding to channel surfing on a television; and
determining that user inputs are to be received based on the historical pattern describing the top of the hour user inputs corresponding to channel surfing on the television;
wherein the presence detection application is configured to decide to ignore the historical pattern describing the top of the hour user inputs corresponding to channel surfing on the television when the user is consuming a movie that does not transition to advertisements in which deciding to ignore the historical pattern describing the top of the hour user inputs corresponding to channel surfing on the television causes the presence detection application to refrain from indicating that the user is absent and to maintain the user's bandwidth consumption.

15. A computer program product according to claim 14, further comprising instructions for prompting the user to forego a high definition stream of data and to instead receive a standard definition stream of data, which reduces the user's bandwidth consumption.

16. A computer program product according to claim 14, further comprising instructions for: prompting the user to retrieve locally stored content, which reduces the user's bandwidth consumption; and restricting the user's access to content, which reduces the user's bandwidth consumption.

17. A computer program product according to claim 14, further comprising instructions for when user inputs corresponding to channel surfing on the television are expected to a user interface, but no user inputs corresponding to channel surfing on the television are received during transition to an advertisement, predicting that no user is present and conserving bandwidth, which reduces the user's bandwidth consumption.

18. A computer program product according to claim 14, further comprising instructions for: receiving a request for content; retrieving a known bitrate for delivering the content to the user; summing the known bitrate with the user's current bandwidth consumption resulting in a sum; comparing the sum to the threshold value; and when the sum exceeds the threshold value, prompting the user to reduce the user's bandwidth consumption.

19. A computer program product according to claim 14, further comprising instructions for: retrieving locally stored content to reduce the user's bandwidth consumption; receiving a reduced resolution stream of data; and processing the locally stored content and the reduced resolution stream of data such that a first window presents the locally stored content and a second window presents the reduced resolution stream of data.

* * * * *